United States Patent
Tuck et al.

(10) Patent No.: US 11,719,828 B2
(45) Date of Patent: Aug. 8, 2023

(54) TECHNIQUES FOR DETECTION OF GLOBAL NAVIGATION SATELLITE SYSTEM (GNSS) ERROR USING MOTION SENSOR OUTPUT

(71) Applicant: QUALCOMM Incorporated, San Diego, CA (US)

(72) Inventors: David Tuck, San Juan Capistrano, CA (US); James Stephen, Lake Forest, CA (US); Inchara Lakshminarayan, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 17/359,901

(22) Filed: Jun. 28, 2021

(65) Prior Publication Data

US 2021/0405213 A1    Dec. 30, 2021

Related U.S. Application Data

(60) Provisional application No. 63/046,416, filed on Jun. 30, 2020.

(51) Int. Cl.
*G01S 19/49* (2010.01)
*G01S 19/39* (2010.01)

(52) U.S. Cl.
CPC ............ *G01S 19/396* (2019.08); *G01S 19/49* (2013.01)

(58) Field of Classification Search
CPC ............................... G01S 19/396; G01S 19/49
USPC ................................................. 342/357.32
See application file for complete search history.

(56) References Cited

U.S. PATENT DOCUMENTS

| | | | |
|---|---|---|---|
| 9,466,881 B1 * | 10/2016 | Berry | G01C 21/20 |
| 10,459,085 B1 * | 10/2019 | Bell | G01S 19/40 |
| 2012/0173185 A1 * | 7/2012 | Taylor | G01S 7/4004 |
| | | | 356/243.1 |

(Continued)

FOREIGN PATENT DOCUMENTS

CN    204023380 U  * 12/2014
DE    102015211279    12/2015

OTHER PUBLICATIONS

International Search Report and Written Opinion—PCT/US2021/039488—ISA/EPO—dated Oct. 25, 2021.

(Continued)

*Primary Examiner* — Harry K Liu
(74) *Attorney, Agent, or Firm* — Thien T. Nguyen

(57) ABSTRACT

Techniques disclosed herein are directed to detect the presence of false, incorrect, or spoofed Global Navigation Satellite Systems (GNSS) signals. Embodiments may comprise receiving, at a mobile device, a global navigation satellite system (GNSS) signal via a GNSS antenna of the mobile device; determining first movement data based on the GNSS signal; determining second movement data based on data from one or more motion sensors of the mobile device, wherein the first movement data and the second movement data each comprise respective movement-related information regarding the mobile device during a time period; and providing an indication that GNSS error is occurring based on a determination that a difference between first movement data and the second movement data exceeds a threshold.

27 Claims, 17 Drawing Sheets

(56) References Cited

U.S. PATENT DOCUMENTS

2019/0302272 A1 10/2019 Balog et al.
2020/0111011 A1* 4/2020 Viswanathan ....... G01C 21/005

OTHER PUBLICATIONS

Lo S., et al., "The Benefit of Low Cost Accelerometers for GNSS Anti-Spoofing", Proceedings of the ION 2017, Pacific PNT Meeting, Jun. 14, 2017 (Jun. 14, 2017), pp. 775-796, XP055839288, 22 Pages, US ISSN: 2329-2849, DOI: 10.33012/2017.15109 ISBN: 978-0-936406-19-0, Retrieved from the Internet: URL: http://dx.doi.org/10.33012/2017.15109abstract. p. 776-p. 780 p. 782 p. 784-p. 785 p. 793-p. 794.

Qiao Y., et al., "A Vision-Based GPS-Spoofing Detection Method for Small UAVs", 2017 13th International Conference on Computational Intelligence and Security (CIS), IEEE, Dec. 15, 2017 (Dec. 15, 2017), pp. 312-316, XP033318438, DOI: 10.1109/CIS.2017.00074. [Retrieved on Feb. 8, 2018], the Whole Document.

* cited by examiner

TECHNIQUES FOR DETECTION OF GLOBAL NAVIGATION SATELLITE SYSTEM (GNSS) ERROR USING MOTION SENSOR OUTPUT

RELATED APPLICATIONS

This application claims the benefit of U.S. Provisional Application No. 63/046,416, filed Jun. 30, 2020, entitled "TECHNIQUES FOR DETECTION OF GLOBAL NAVIGATION SATELLITE SYSTEM (GNSS) SPOOFING USING MEMS OUTPUT", which is assigned to the assignee hereof, and incorporated herein in its entirety by reference.

BACKGROUND

Global Navigation Satellite Systems (GNSS) can be used to determine the location and/or attitude of a user equipment (UE) or mobile device (e.g., a vehicle, a vessel, or an aircraft). A GNSS system includes a network of satellites the broadcast GNSS signals. A GNSS receiver can receive the GNSS signals via an antenna and calculate the location of the receiver, the time of signal reception, and/or the altitude of the receiver. Location is determined by receiving GNSS satellite signals from multiple satellites in known positions, determining the transition time for each of the signals, and solving for the position of the receiving antenna based on the known data.

Spoofing systems have been developed to "spoof" or trick a GNSS navigation system into determining an inaccurate position or an inaccurate time. This can cause mobile devices such as vehicles that rely on GNSS navigation signals to stray off course. In extreme cases GNSS spoofing systems can take control of a navigation system and reroute a vehicle to an unintended location. Spoofing systems can result in accidents and cause drivers not to trust the information provided by the navigation system.

Radio interference can overpower weak GNSS signals, causing satellite signal loss and potentially loss of positioning. Spoofing, is an intelligent form of interference which makes the receiver believe it is at a false time and/or location. During a spoofing attack a radio transmitter located nearby sends fake GPS signals into the target receiver. Additionally a system-level failure in a GNSS can cause users to have such errors as incorrect time, position, velocity or lack of fixes and be equivalent to GNSS spoofing.

BRIEF SUMMARY

Techniques disclosed herein are directed to detect the presence of false, incorrect, or spoofed GNSS signals. Mitigation techniques can then be employed upon detection of the false GNSS satellite signals. According to some embodiments, one or more GNSS signals can be received via a GNSS antenna. Positioning techniques can determine a movement of a mobile device based on the one or more GNSS signals measured at a GNSS sensor of the mobile device. The disclosed techniques can measure movement of the mobile device using one or more sensors (e.g., an accelerometer, gyroscope, magnetometer, pressure sensor, and/or other type of a micro-electromechanical system (MEMS) sensor). The movement of the mobile device observed by the one or more sensors can be compared with movement derived from data from the one or more GNSS signals. A difference can be determined between the movement from the one or more GNSS signals and the movement observed by the one or more sensors. The difference can be compared with one or more threshold values. If the difference exceeds one or more threshold values, the technique can provide an indication of spoofing of the GNSS sensor.

An example method for detecting Global Navigation Satellite System (GNSS) error, according to this disclosure, comprises receiving, at a mobile device, a global navigation satellite system (GNSS) signal via a GNSS antenna of the mobile device. The method also comprises determining first movement data based on the GNSS signal. The method also comprises determining second movement data based on data from one or more motion sensors of the mobile device, wherein the first movement data and the second movement data each comprise respective movement-related information regarding the mobile device during a time period. The method also comprises providing an indication that a GNSS error is occurring based on a determination that a difference between first movement data and the second movement data exceeds a threshold.

An example mobile device for detecting Global Navigation Satellite System (GNSS) error, according to this disclosure, comprises a GNSS receiver communicatively coupled with a GNSS antenna, one or more motion sensors, a memory, one or more processors communicatively coupled with the GNSS receiver, the one or more motion sensors, and the memory, wherein the one or more processors are configured to receive, via the GNSS receiver, a global navigation satellite system (GNSS) signal via the GNSS antenna. The one or more processing units are further configured to determine first movement data based on the GNSS signal. The one or more processing units are further configured to determine second movement data based on data from the one or more motion sensors of the mobile device, wherein the first movement data and the second movement data each comprise respective movement-related information regarding the mobile device during a time period. The one or more processing units are further configured to provide an indication that a GNSS error is occurring based on a determination that a difference between first movement data and the second movement data exceeds a threshold.

An example apparatus for detecting Global Navigation Satellite System (GNSS) error, according to this disclosure, comprises means for receiving a global navigation satellite system (GNSS) signal. The apparatus further comprises means for determining first movement data based on the GNSS signal. The apparatus further comprises means for determining second movement data based on data from one or more motion sensors, wherein the first movement data and the second movement data each comprise respective movement-related information regarding a mobile device during a time period. The apparatus further comprises means for providing an indication that a GNSS error is occurring based on a determination that a difference between first movement data and the second movement data exceeds a threshold.

According to this disclosure, an example non-transitory computer-readable medium stores instructions for detecting Global Navigation Satellite System (GNSS) error, the instructions comprising code for receiving, at a mobile device, a global navigation satellite system (GNSS) signal via a GNSS antenna of the mobile device. The instructions further comprise code for determining first movement data based on the GNSS signal. The instructions further comprise code for determining second movement data based on data from one or more motion sensors of the mobile device, wherein the first movement data and the second movement data each comprise respective movement-related information regarding a mobile device during a time period. The instructions further comprise code for providing an indication that a GNSS error is occurring based on a determination that a difference between first movement data and the second movement data exceeds a threshold.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
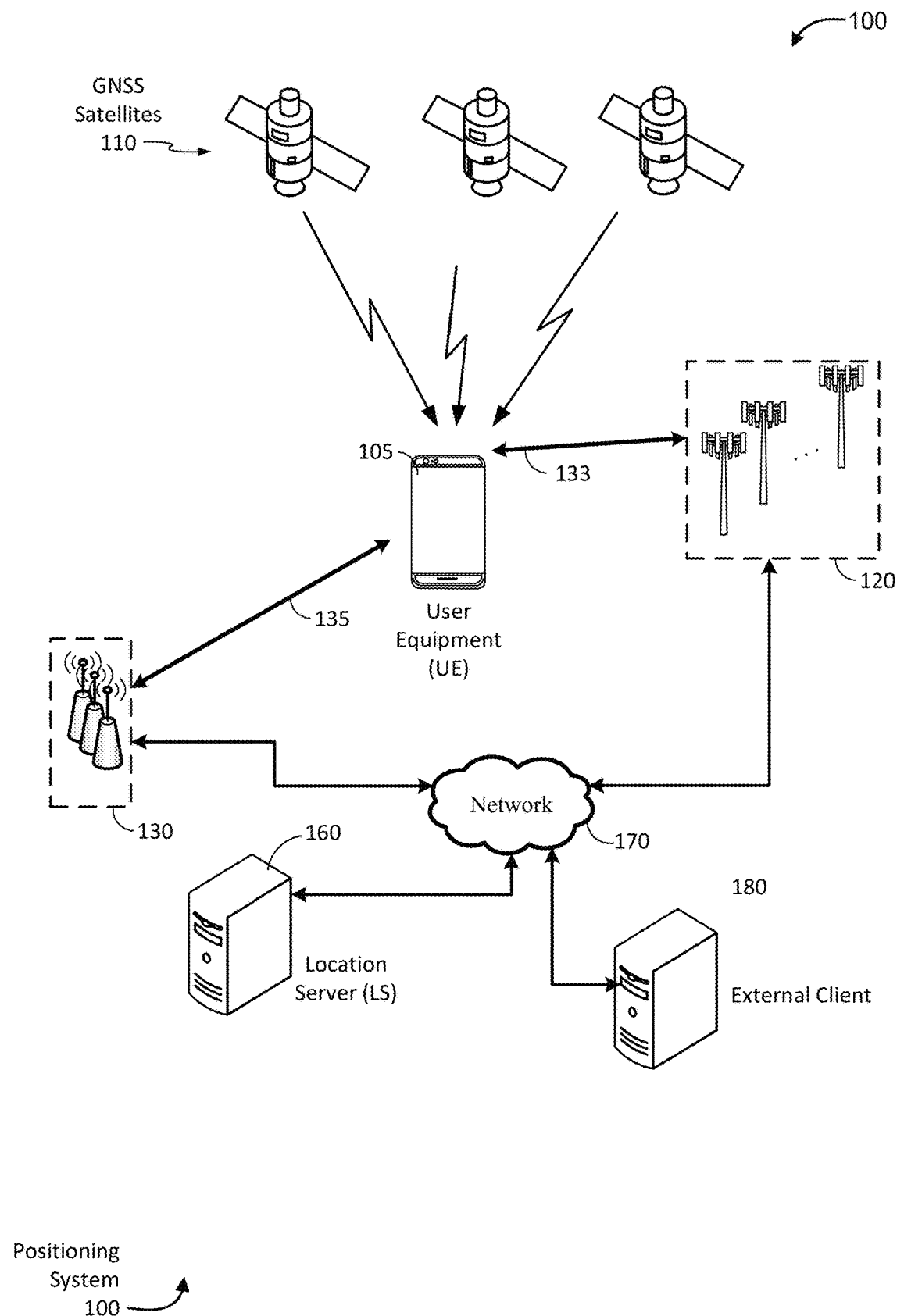
FIG. 1 is a diagram of a satellite positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure of the appended claims.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

The methodologies described herein may be implemented by various means depending upon applications according to particular embodiments. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

As used herein, the terms "mobile device" and "user equipment" (UE) may be used interchangeably and are not intended to be specific or otherwise limited to any particular radio access technology (RAT), unless otherwise noted. In general, a mobile device and/or UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, vessel, aircraft motorcycle, bicycle, etc.), Internet of Things (IoT) device, etc.), or other electronic device that may be used for Global Navigation Satellite Systems (GNSS) positioning as described herein. According to some embodiments, a mobile device or UE may be used to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (or UT), a "mobile device," a "mobile terminal," a "mobile station," or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on IEEE 802.11, etc.), and so on.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

A "space vehicle" (SV), as referred to herein, relates to an object that is capable of transmitting signals to receivers on the earth's surface. In one particular embodiment, such a SV may comprise a geostationary satellite. Alternatively, a SV may comprise a satellite traveling in an orbit and moving relative to a stationary position on the earth. However, these are merely examples of SVs and claimed subject matter is not limited in these respects.

A "location", as referred to herein, relates to information associated with a whereabouts of an object or thing according to a point of reference. Here, for example, such a location may be represented as geographic coordinates such as latitude and longitude. In another example, such a location may be represented as earth-centered XYZ coordinates. In yet another example, such a location may be represented as a street address, municipality or other governmental jurisdiction, postal zip code and/or the like. However, these are merely examples of how a location may be represented according to particular embodiments and claimed subject matter is not limited in these respects.

Location determination techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

According to an embodiment, a device and/or system may estimate its location based, at least in part, on signals received from SVs. In particular, such a device and/or system may obtain "pseudorange" measurements comprising approximations of distances between associated SVs and a navigation satellite receiver. In a particular embodiment, such a pseudorange may be determined at a receiver that is capable of processing signals from one or more SVs as part of a Satellite Positioning System (SPS). Examples of GNSS systems include Naystar Global Positioning System (GPS), established by the United States; Globalnaya Navigatsionnay Sputnikovaya Sistema, or Global Orbiting Navigation Satellite System (GLONASS), established by the Russian Federation and similar in concept to GPS; the BeiDou Navigation Satellite System (BDS) created by the Chinese; and Galileo, also similar to GPS but created by the European Community and slated for full operational capacity in the near future. To determine its position, a satellite navigation receiver may obtain pseudorange measurements to four or more satellites as well as their positions at time of transmitting. Knowing the SVs' orbital parameters, these positions can be calculated for any point in time. A pseudorange measurement may then be determined based, at least in part, on the time a signal travels from a SV to the receiver, multiplied by the speed of light. While techniques described herein may be provided as implementations of location determination in a GPS and/or Galileo types of SPS as specific illustrations according to particular embodiments, it should be understood that these techniques may also apply to other types of SPS', and that claimed subject matter is not limited in this respect.

A "Global Navigation Satellite System" (GNSS) as referred to herein relates to an SPS comprising SVs transmitting synchronized navigation signals according to a common signaling format. Such a GNSS may comprise, for example, a constellation of SVs in synchronized orbits to transmit navigation signals to locations on a vast portion of the Earth's surface simultaneously from multiple SVs in the constellation. A SV which is a member of a particular GNSS constellation typically transmits navigation signals in a format that is unique to the particular GNSS format. Accordingly, techniques for acquiring a navigation signal transmitted by a SV in a first GNSS may be altered for acquiring a navigation signal transmitted by a SV in a second GNSS. In a particular example, although claimed subject matter is not limited in this respect, it should be understood that GPS, Galileo and Glonass each represent a GNSS which is distinct from the other two named SPS. However, these are merely examples of SPS' associated with distinct GNSS' and claimed subject matter is not limited in this respect.

According to an embodiment, a navigation receiver may obtain a pseudorange measurement to a particular SV based, at least in part, on an acquisition of a signal from the particular SV which is encoded with a periodically repeating position navigation (PN) code sequence. Acquisition of such a signal may comprise detecting a "code phase" which is referenced to time and associated with a point in the PN code sequence. In one particular embodiment, for example, such a code phase may be referenced to a state of a locally generated clock signal and a particular chip in the PN code sequence. However, this is merely an example of how a code phase may be represented and claimed subject matter is not limited in this respect.

According to an embodiment, detection of a code phase may provide several ambiguous candidate pseudoranges or pseudorange hypotheses at PN code intervals. Accordingly, a navigation receiver may obtain a pseudorange measurement to the SV based, at least in part, upon the detected code phase and a resolution of ambiguities to select one of the pseudorange hypotheses as the pseudorange measurement to the SV. As pointed out above, a navigation receiver may estimate its location based, at least in part, on pseudorange measurements obtained from multiple SVs.

Although embodiments described herein are largely directed toward detection of spoofing using sensor output, embodiments are not so limited. Some embodiments may be used, for example, to detect GNSS system failure. Failure of a particular GNSS constellation may occasionally occur, in which case satellites of the constellation may transmit incorrect data. This type of GNSS system failure may be detected using the embodiments described herein.

As illustrated below according to a particular embodiment, a navigation receiver may acquire a first signal from a first SV to detect a code phase of the first signal. In acquiring a second signal from a second SV, a navigation receiver may search for a code phase over a limited code phase search range in the second signal based, at least in part, on the code phase of the acquired first signal. Accordingly, the code phase of the acquired first signal allows such a navigation receiver to acquire the second signal faster and/or using fewer processing resources.

FIG. 1 is a simplified illustration of a positioning system 100 in which a UE 105, location server (LS) 160, and/or other components of the positioning system 100 can use the techniques provided herein for determining and estimated location of UE 105, according to an embodiment. The techniques described herein may be implemented by one or more components of the positioning system 100. The positioning system 100 can include a UE 105, one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server (LS) 160; network 170; and an external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Particular examples of network 170 include a Long Term Evolution (LTE) wireless network, a Fifth Generation (5G) wireless network (also referred to as New Radio (NR) wireless network), a Wi-Fi wireless local area network (WLAN) and the Internet. LTE, 5G and NR are wireless technologies defined, or being defined, by the $3^{rd}$ Generation Partnership Project (3GPP). Network 170 may also include more than one network and/or more than one type of network.

The base stations (BS) 120 and access points (APs) 130 are communicatively coupled to the network 170. In some embodiments, the base station 120 may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with Internet-connected devices, including LS 160, using a second communication link 135.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for 5G or NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g., data transported using the Internet Protocol (IP) and/or Transmission Control Protocol (TCP)) from the perspective of network 170.

An estimated location of UE 105 can be used in a variety of applications—e.g., to assist direction finding or navigation for a user of UE 105 or to assist another user (e.g., associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g., a latitude and longitude and possibly altitude) or a relative location of UE 105 (e.g., a location expressed as distances north or south, east or west and possibly above or below some other known fixed location or some other location such as a location for UE 105 at some known previous time). A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., 95% confidence).

The external client 180 may be a web server or remote application that may have some association with UE 105 (e.g., may be accessed by a user of UE 105) or may be a server, application, or computer system providing a location service to some other user or users which may include obtaining and providing the location of UE 105 (e.g., to enable a service such as friend or relative finder, asset tracking or child or pet location). Additionally or alternatively, the external client 180 may obtain and provide the location of UE 105 to an emergency services provider, government agency, etc.

When determining the position of the UE 105 using GNSS, the UE 105 may use a GNSS receiver to determine GNSS pseudorange, GNSS code phase, and/or GNSS carrier phase of RF signals received from GNSS satellites 110. These RF signals may be referred to as GNSS timing signals or GNSS navigation signals. However, as noted, these GNSS satellite signals may be spoofed. This can result in the GNSS receiver being unable to determine the location of the UE 105 or determining an incorrect location (also referred to herein as a "spoofed" location or position) of the UE 105. Spoofed GNSS satellite signals can also result in the GNSS receiver determining other spoofed states besides location, such as velocity and\or time. An example of this is illustrated in FIG. 2.

Figure 2:
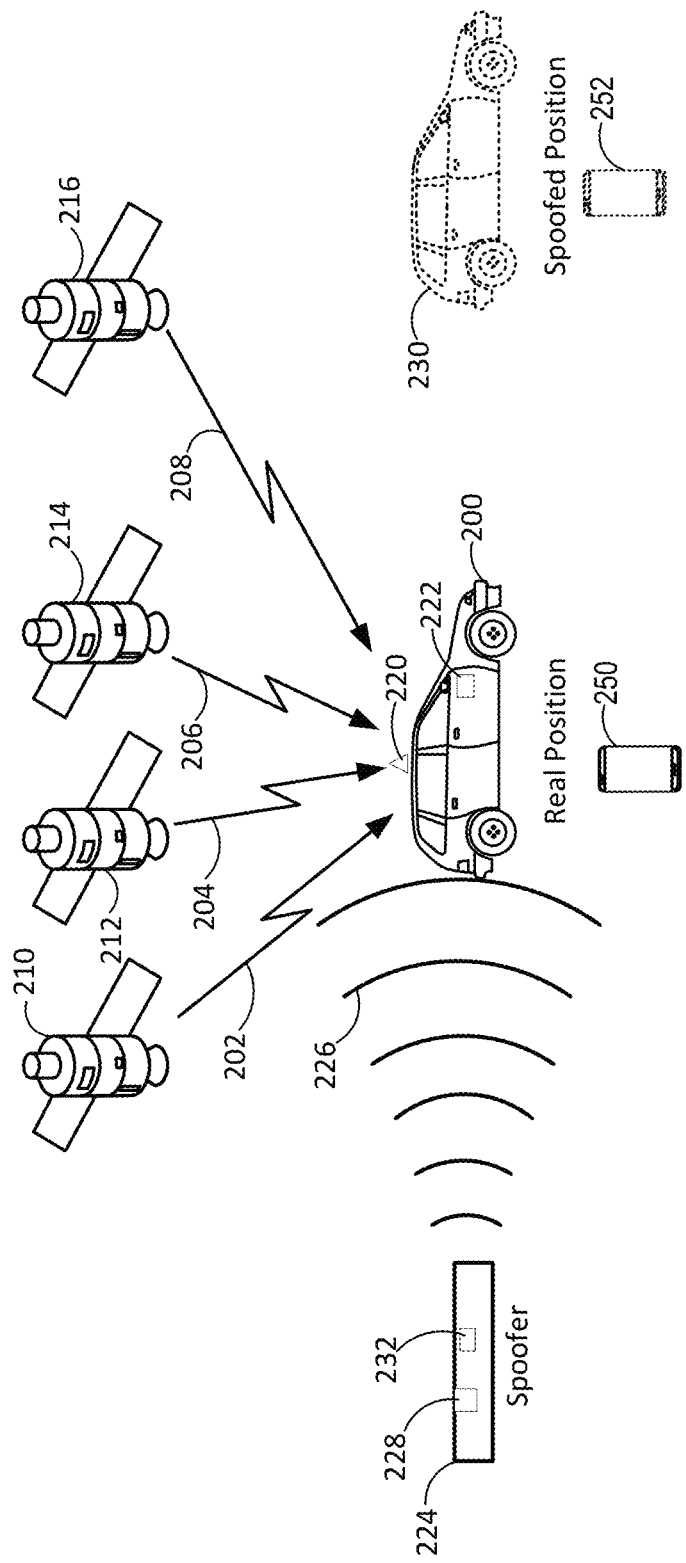
FIG. 2 is a diagram illustrating spoofing of a GNSS signal according to an embodiment.

FIG. 2 depicts a situation in which a vehicle 200 using GNSS navigation is receiving false GNSS satellite signals (spoofing). Vehicle 200 receives real GNSS satellite signals 202, 204, 206, and 208 from a plurality of GNSS satellites 210, 212, 214, and 216, respectively. GNSS satellite signals 202, 204, 206, and 208 are received by antenna 220 which is attached to the vehicle 200. GNSS receiver 222, which is electrically connected to antenna 220, receives signals 202, 204, 206, and 208, and computes the GNSS location coordinates of a location based on measurements of ranging information contained within signals 202, 204, 206, and 208. Vehicle 200 in various embodiments can include a navigation system and possibly a self-driving system that drives the vehicle 200 over a prescribed course using the computed GNSS coordinates of the location of the vehicle 200. It is to be understood that while antenna 220 is shown receiving GNSS satellite signals 202, 204, 206, and 208 from four GNSS satellites 210, 212, 214, and 216, antenna 220 can be receiving GNSS satellite signals from any number of GNSS satellites. Antenna 220 receives GNSS satellite signals from a plurality of GNSS satellites, where a plurality is any number greater than one.

FIG. 2 also depicts a spoofer 224. The spoofer 224 can include an antenna 228 and transmitter 232. The spoofer 224 can generate a wireless spoofing signal 226 that is received by the vehicle antenna 220. Spoofing signal 226 can be a composite signal which contains a plurality of false GNSS satellite signals. Spoofing signal 226 can be generated so as to mimic real GNSS satellite signals. In various embodiments, the spoofer 224 is located at a fixed geographic location. In some embodiments, the spoofer 224 can be configured to be mobile (e.g., attached to another vehicle or vessel).

GNSS signal spoofer 224 can be designed to create false GNSS satellite signals in several ways. In some embodiments spoofer 224 creates spoofing signal 226 by simulating real GNSS satellite signals programmed with the desired false satellite data. In FIG. 2, the spoofer 224 captures real GNSS signals 202, 204, 206, 208 at an antenna 228, and then rebroadcasts these signals with a transmitter 232. In the embodiment shown in FIG. 2, spoofer 224 creates spoofing signal 226 by re-broadcasting live GNSS signals received at a location different from the GNSS navigational system that is to be spoofed. It is to be understood that spoofer 224 can create and broadcast spoofing signal 226 using any method that creates a spoofing signal 226 that includes data meant to be accepted as real GNSS signals. The spoofer 224 or multiple spoofers 224 may simulate stationary or moving locations as well. For example, some spoofers 224 can simulate a location that moves in a circle around a geographic area.

In the embodiment shown in FIG. 2, the spoofer 224 can includes an antenna 228 and a transmitter 232. Spoofer 224 generates spoofing signal 226 by re-broadcasting GNSS satellite signals 202, 204, 206, and 208 received at spoof antenna from live GNSS satellites 210, 212, 214, and 216. Satellites 210, 212, 214, and 216, can be the same or different GNSS satellites as satellites 210, 212, 214, and 216. Spoofing antenna 228 can be located at spoof location that is offset from the real vehicle 200 location. Real GNSS satellite signals 202, 204, 206, and 208 are combined into composite spoofing signal 226 and rebroadcast by a spoofing transmitter 232.

The spoofing signal 226 can be a composite of a plurality of GNSS satellite signals 202, 204, 206, and 208, as received by antenna 220. When GNSS satellite signals 202, 204, 206, and 208 are rebroadcast from the spoofer transmitter (a spoofing process known as "meaconing"), they become false GNSS satellite signals (or "meacons") because they contain data as received by the spoofer antenna 228 at a different location from the real position resulting in a spoofed position 230. Spoofing signal 226 can contains any number of false GNSS satellite signals.

The power level of spoofing signal 226 can be set such that when spoofing signal 226 is received by antenna 220, spoofing signal 226 overpowers real GNSS satellite signals 202, 204, 206, and 208. Consequently receiver 222 uses spoofing signal (e.g., spoofing signal 226) to compute a GNSS location based on false GNSS satellite signal. Specifically, receiver 222 will measure the GNSS satellite signal phase (code phase and/or carrier phase) φ values and/or other values (e.g., Doppler measurements) of spoofing signal 226, will use these values to compute GNSS location coordinates for a different location other than the true location, and will report that vehicle is at different location instead of its true location. This is the intent of spoofer 224 in some embodiments: to make receiver 222 determine and report that vehicle 200 is at false location, e.g., spoofed position 230 that is offset relative to real position. Spoofing of a navigational system can also be performed in order to make a navigational device provide false timing data. GNSS devices are often used in critical timing applications. Thus in some embodiments detection of false GNSS satellite signals is performed to prevent a spoofing system from causing false timing data to be provided by a GNSS device.

The spoofing signal 226 can be broadcast at a significantly (e.g., many dB) stronger signal strength than the actual GNSS constellation signals 202, 204, 206, and 208. The typical GNSS receiver (e.g., GNSS receiver 222), doing a broad/standalone search will lock onto the strongest signals, typically locking onto one strong satellite and then determining the search windows for the rest of the GNSS satellites 210, 212, 214, and 216 upon that first satellite. Thus, a location-ignorant device, that has ephemeris or long term orbital predictions/long term ephemeris, can set search windows such that they will only see the spoofed constellation, to the extent that the spoofed satellites are consistent with each other, as predicted by the almanac and/or collective ephemeris and/or long term orbital predictions. Thus, the spoofer 224 may generate the expected satellite constellation signals for the spoofed location based upon existing orbital data (e.g., almanac, ephemeris, long term ephemeris). If the spoofed satellites are not consistently generated, in that their broadcast ephemeris data is not consistent with prior received ephemeris data, long term orbital predictions and/or GNSS almanac data, techniques can detect the spoof based on the inconsistency, (e.g., satellites that would not be present together at the spoofed locations at the spoofed time).

If the GNSS receiver 222 obtains time off of the time of day (TOD) header information from the spoofed GNSS satellite, that will impact the rest of the GNSS satellite searches, even if the GNSS receiver 222 have correct ephemeris, long term orbital data, also called long term ephemeris, and/or almanac information since it will bias the search windows for the rest of the constellation. In some less robust GNSS receiver 222 implementations, just the time bias alone may prevent a fix. The time bias can be sanity checked based on a) pre-existing time on the device looking for a discontinuity or time change; b) network time from the Internet/Wi-Fi or from WAN; c) GNSS time from other constellations.

Ultimately, the GNSS receiver 222 or navigation system overall are going to want to look for consistent time across multiple systems, allowing for reasonable error or discrepancy between time derived from different systems and/or local clock drift at the device. A GNSS signal with significantly different time, not predictable by typical error between systems can be ignored and/or de-weighted or multiple location solutions based on different sources (WAN, Wi-Fi, GLONASS, GPS, BeiDou, Galileo, Kalman filter-propagated location, etc.) may be calculated and compared, keeping the information that is consistent among the largest group of participating sources and/or among the most trustworthy sources. Bi-directional sources such as WAN, for example, may be harder to spoof than transmit only sources such as GNSS, as the connection to the network must also be spoofed and/or intercepted and passed along. Similarly, camera feed, particularly from a moving vehicle would be hard to spoof consistently with all of the other sources.

Described herein is a system and method for detecting the presence of false GNSS satellite signals such as spoofing signal 226, where spoofing signal 226 comprises false data that represents itself as one or more than one GNSS satellite signal from one or more than one GNSS satellite. The system and method for detecting false GNSS satellite signals according to embodiments of the invention uses a plurality of GNSS antennas for determining that at least one of the GNSS satellite signals received is a false GNSS satellite signal, in other words it contains false data. The system disclosed herein for detecting false GNSS satellite signals is in some embodiments a GNSS attitude system. GNSS attitude systems may use two or more GNSS antennas attached to a rigid body for determining the attitude of the body.

A mobile device 250 is also depicted in FIG. 2. The mobile device 250 can also receive GNSS signals 202, 204, 206, 208 to determine location. The mobile device 250 can also receive the spoofing signal 226 originating from spoofer 224. The spoofing signal 226 can be received by a GNSS antenna (not shown) on the mobile device 250 to trick the navigation system of the mobile device 250 to determine that the device is at a spoofed position 252. In certain circumstances, spoofing may be more likely to be aimed at mobile devices 250 rather than vehicles moving across a broader area, with the notable exception of some institutional/governmental spoofing which is broadcast in sensitive/secure military areas to prevent navigation in those areas for all devices.

A vehicle 200 would be harder to spoof in that is not limited to an enclosed area like a mall, but rather, the spoofing signal 226 would need stronger signal sources, possibly multiple sources spread out over a larger area. Thus a vehicle 200 spoofing situation and the mobile device 250 spoofing situation pose slightly different challenges to the spoofers 224 and slightly different detection opportunities.

In outdoor situations, the other GNSS constellations can also be visible and so a spoofer 224 of one constellation (e.g., GPS) can be subject to verification from the other GNSS constellations (e.g., GLONASS and Beidou). The spoofer signal 224 is generally observed to be much stronger than the GNSS signals 202, 204, 206, 208 as the spoofer attempts to overpower the actual signals. Mitigation techniques can include searching for lower power signals in the range that the GNSS receiver 222 would typically expect across all the constellations. So, for example, if GPS is being spoofed, and if the GNSS receiver 222 detects GLONASS and Beidou and those GNSS signals are not being spoofed, the GLONASS and Beidou GNSS signals can be at much lower energy levels. Techniques can use the other constellations and/or other terrestrial positioning techniques (e.g., via Wi-Fi and/or WAN), to predict the actual search window for each GPS satellite and still detect the true GPS satellites, to the extent that the spoofed signals are not in the same search window as the true satellites (which is likely). A GNSS search window is a grid of energy bins outlined in time and frequency in order to account for doppler shift of the GNSS signals. Therefore, if the GNSS receiver 222 knows the time and approximate location, it can actually predict the correct search windows for the GNSS satellites and in essence ignore the spoofed signals or at least de-weight them in confidence/impact relative to location calculations. This is harder to do if the spoofing is close in time and for a small distance like 50 meters versus 500 kilometers distant and the doppler dimensions would be significantly different between the spoofed and the actual signals.

The impact of even a smaller spoofing area is theoretically much bigger for a vehicle 200 that is moving. However, the vehicle 200 can include several different redundant systems that can be used to rely on including map data to determine the real position of the vehicle 200 on the map, and constraints such as driving along roads and not through buildings. Other sensors, e.g., cameras, RADAR, LIDAR and SONAR can be used to determine inter-vehicle and inter-object spacing and location. Snap to map techniques can account for inaccurate GPS fixes or disagreement between real location and map location.

The non-GNSS systems in a self-driving, or semi-autonomous vehicle may be able to navigate on their own for at least a period of time, the GNSS serving to localize the vehicle on the map data. WAN and Wi-Fi crowd sourced maps can also provide map localization data as well as camera data, if crowd-sourced and available, may provide redundant localization data.

Figure 3:
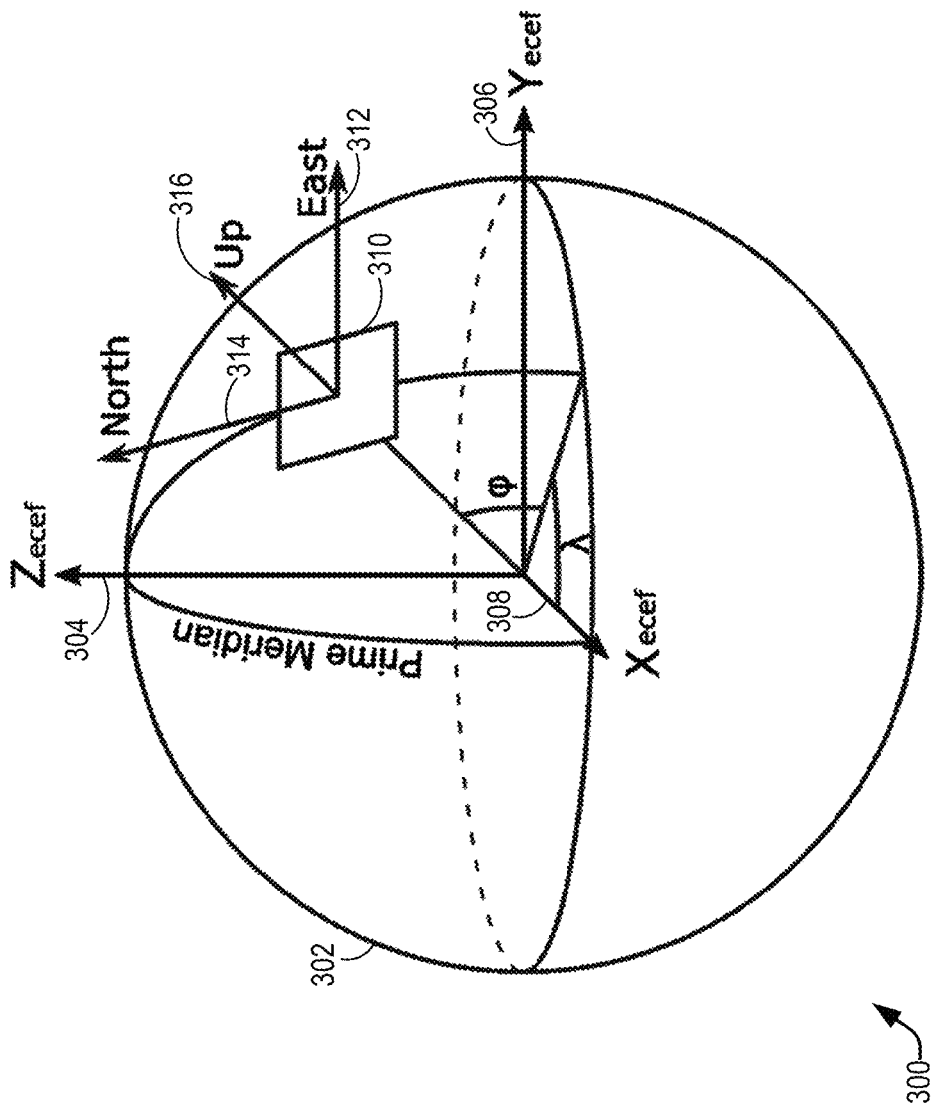
FIG. 3 illustrates an exemplary local tangent plane coordinate system.

According to embodiments herein, movement data can be obtained from one or more sensors of a mobile device and compared with movement derived from a GNSS receiver of the mobile device. Acceleration, for example, can be obtained from accelerometers and from a GNSS sensor (e.g., by taking a derivative of velocity obtained by the GNSS sensor). Rotation, for example, can be obtained from a gyroscope and/or from a derivative of a sensor (e.g., magnetometer) providing orientation. Additional and/or alternative sensors and/or movement types can be used. Movement based on GNSS signals can then be compared with movement based on sensors. If movement from GNSS varies beyond a threshold from the sensors, GNSS spoofing may be determined to be occurring. Additional details regarding embodiments are described hereafter. To allow the comparison between GNSS and motion sensors, data from one or both may need to be mapped to a common coordinates system. FIG. 3 provides additional detail regarding an example coordinate system.

FIG. 3 illustrates an exemplary local tangent plane coordinate system 300. Local tangent plane coordinates are a geographical coordinate system based on the local vertical direction and the Earth's 302 axis of rotation. It consists of three coordinates: one represents the position along the northern axis 314, one along the local eastern axis 312, and one represents the vertical position or up 316. Two right-handed variants exist: east 312, north 314, up 316 (ENU) coordinates and north, east, down (NED) coordinates.

FIG. 3 illustrates an east north up (ENU) coordinate system. In many targeting and tracking applications the local East 312, Northern axis 314, Up 316 (ENU) Cartesian coordinate system is far more intuitive and practical than earth centered earth fixed (ECEF) or Geodetic coordinates. The local ENU coordinates are formed from a plane tangent to the Earth's surface fixed to a specific location and hence it is sometimes known as a "Local Tangent" or "local geodetic" plane 310. By convention the east axis is labeled x 308, the north y 306 and the up z 304.

As noted, to detect whether GNSS spoofing is occurring, embodiments may employ a process in which the movement of a mobile device based on data from a GNSS receiver of the mobile device is compared with movement of the mobile device based on one or more motion sensors of the mobile device. The graphs provided in FIGS. 4-11 provide additional detail regarding an example of how such data may be compared, according to some embodiments.

Figure 4:
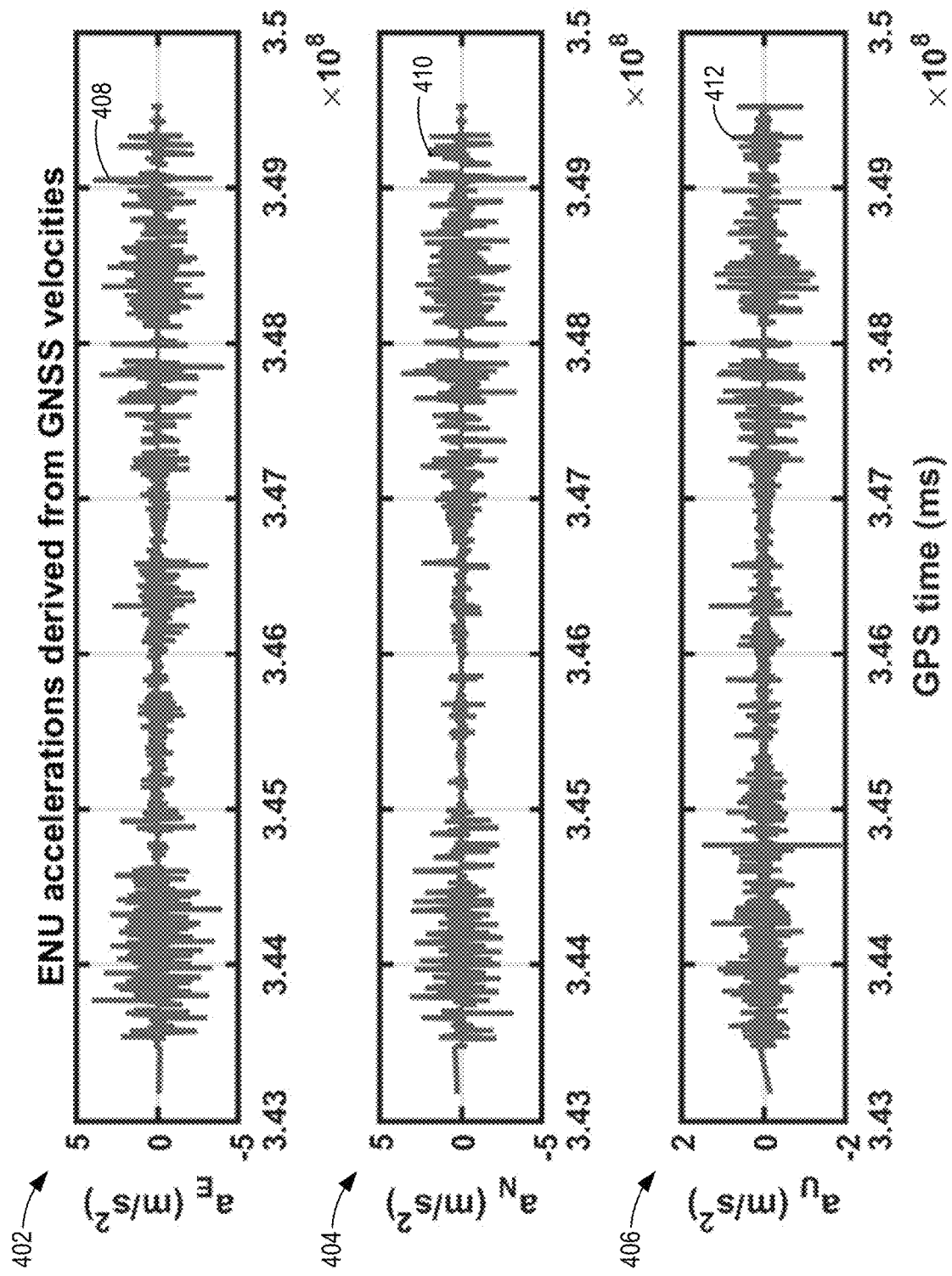
FIG. 4 illustrates exemplary graphs of accelerations derived from GNSS velocities.

FIG. 4 illustrates graphs of example accelerations derived from GNSS velocities, according to some embodiments. In this example GNSS signal accelerations are obtained by taking the derivatives of the velocities for east, north, and up, where the velocities are determined by calculations made on GNSS signals received by GNSS satellites. In certain embodiments, it may be possible to measure GNSS signal acceleration directly and compute a solution.

FIG. 4 illustrates plots for GNSS acceleration data having an east axis 402, a north axis 404, and an up axis 406 using the local tangential plane coordinates described above with reference to FIG. 3. GNSS acceleration data is depicted as a plot of data for each axis, specifically east data 408, north data 410, and up data 412. The GNSS accelerations are depicted in meters per second per second (m/s$^2$) over a time period in milliseconds (ms).

Figure 5:
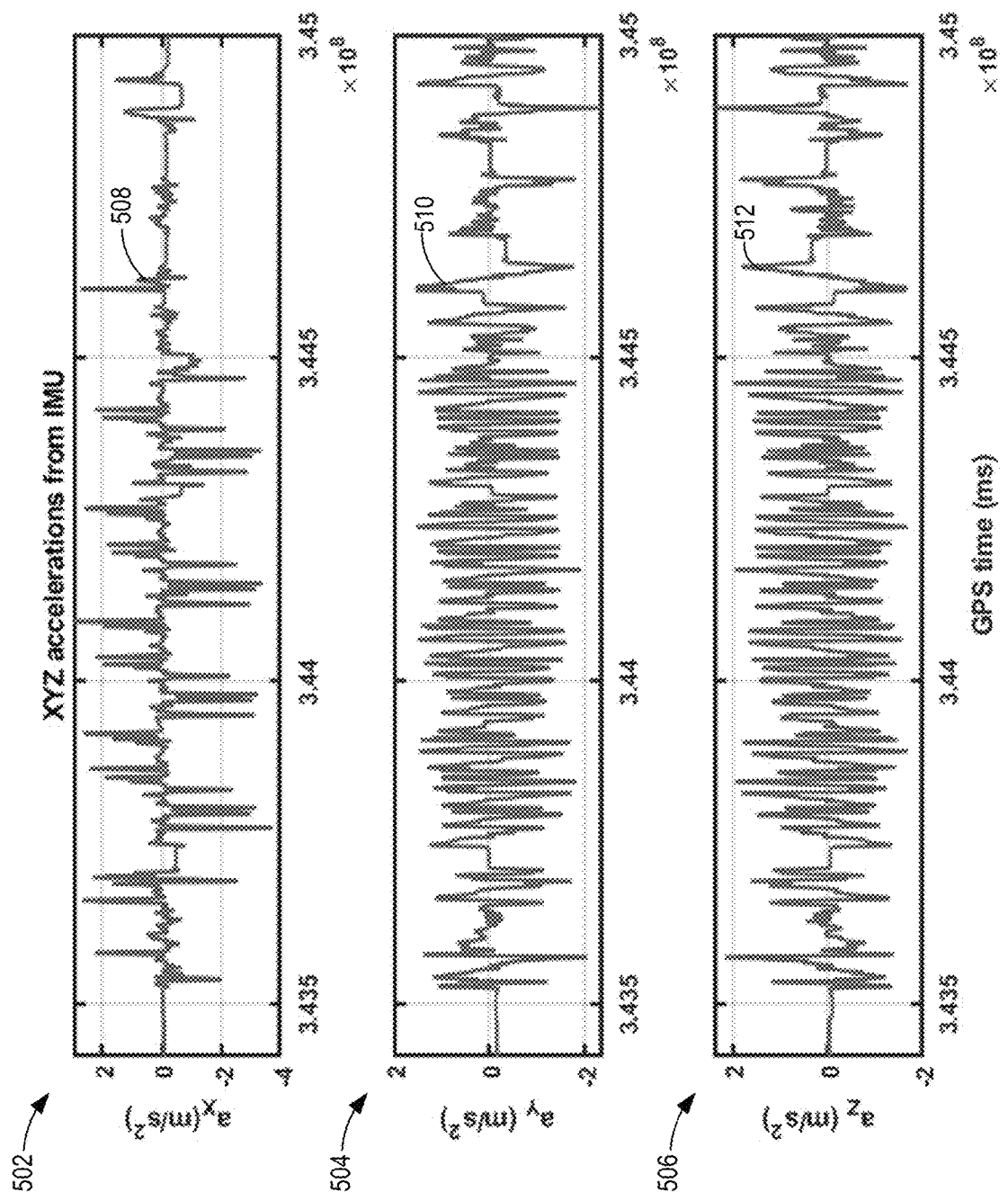
FIG. 5 illustrates exemplary accelerations of a vehicle derived from one or more motion sensors.

FIG. 5 illustrates graphs of example accelerations of a vehicle derived from a motion sensor (in particular, an inertial measurement unit (IMU), which may comprise one or more accelerometers, gyroscopes, etc.). The motion sensor accelerations may be obtained directly from acceleration data and/or may be obtained by taking the derivatives of the velocities for x, y, and z coordinate data. Further, the acceleration data from the mobile sensor may be the actual raw measurement frame so it is not rotated into a local level frame. So x, y, and z coordinate data therefore may not correspond to east, north, and up as provided for the local tangential plane. FIG. 5 illustrates a plot for acceleration data having an x-axis 502, a y-axis 504, and a z-axis 506 using the global coordinate described above with reference to FIG. 3. Acceleration data is depicted as a plot of data for each axis, specifically x-axis data 508, y-axis data 510, and z-axis data 512. The accelerations are depicted in m/s$^2$ over a time period measured in ms. According to some embodiments, the motion sensor may be co-located with the GNSS antennas or offset by a known distance (e.g., on the body of the mobile device) from the GNSS antennas.

According to some embodiments, gravity can be accounted for where the one or more motion sensors comprise accelerometers. In one example, the mobile device may comprise a stationary vehicle where only gravity is the only acceleration experienced by the mobile device. Therefore, all that should be depicted in the acceleration data is sensor bias, noise, plus a gravity vector. This can be subtracted from acceleration data when the mobile device moves, enabling an easier comparison with motion data from the GNSS receiver. For the data presented in FIG. 5, for example, gravity and bias has been removed. According to some embodiments, acceleration data may be passed through a very long low-pass filter to estimate essentially the growth of the zero output, or the mean output.

In various embodiments, the motion sensor data may be determined in the local tangential plane coordinates (e.g., described above with reference to FIG. 3) such that frames between GNSS and motion sensor data are consistent. Because the position and orientation of the vehicle and sensor orientation inside the vehicle are seldom precisely known, and errors such as biases and scale factors corrupt the motion sensors, GNSS can be used to provide an absolute positioning reference to calibrate sensor platform orientation and errors. Because GNSS sometimes may be unreliable due to spoofing, techniques for identifying spoofed GNSS data during calibration of the motion sensors can be used, according to some embodiments. Additionally or alternatively, embodiments may take advantage of calibration previously obtained under un-spoofed GNSS conditions to provide greater fidelity in spoofing detection.

Figure 6:
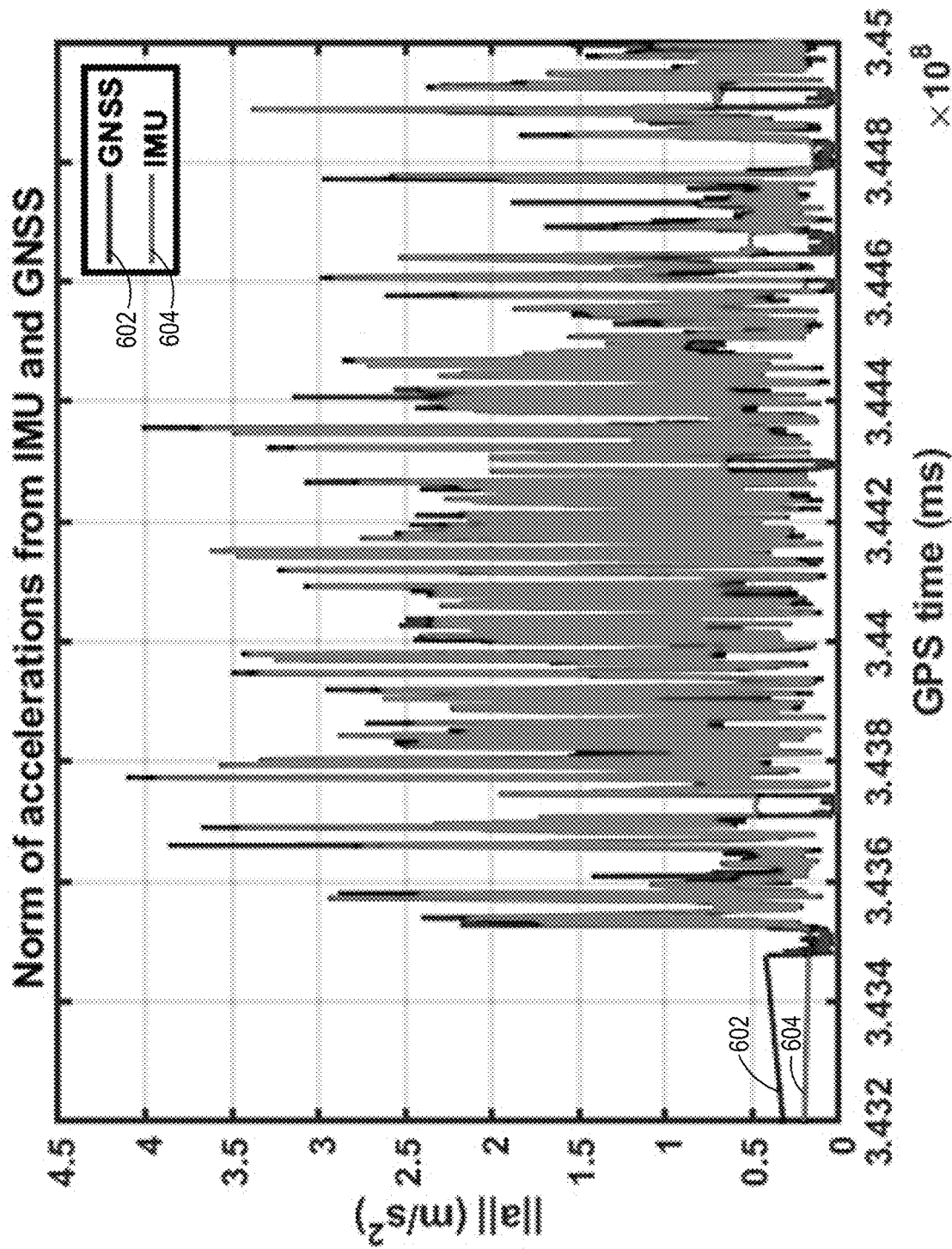
FIG. 6 illustrates a graph of normalized accelerations from motion sensor and GNSS signals.

According to some embodiments, the norm of the vector components can be taken to facilitate the comparison of the GNSS data to the motion sensor data. FIG. 6 illustrates a graph of acceleration norm from the motion sensor (accelerometer output with gravity removed) and GNSS. Comparisons can be made of different components in different frames, for example ECEF(XYZ), ENU, along/across track, etc.

The comparison of the motion sensor data with the GNSS data may comprise an analysis of the motion sensor data and the GNSS data during various time periods. FIG. 6 illustrates the normalized GNSS acceleration 602 and the normalized motion sensor acceleration 604 over a time period that is measured in ms. As depicted in FIG. 6, the acceleration data for the two sources appears to be consistent. More specifically, variations between acceleration for the two sources appear to remain below a threshold. As such, a comparison of the motion sensor data with the GNSS data depicted in FIG. 6 may result in a determination that no spoofing is present in the GNSS signals.

Depending on desired functionality, this threshold used for comparison may be based on one or more of a variety of factors. The threshold may be set, for example, based on modeled and/or measured values. The threshold may be larger or smaller, based on the type of movement and/or motion sensors used in the comparison. According to some embodiments, the threshold may be set as a percentage (e.g., 5%, 10%, 15% variance, etc.), and absolute value (e.g., 0.1, 0.2, 0.3 m/s$^2$, etc.), or the like, and may be used to compare values of individual data points and/or values of data (e.g., averages, means, etc.) derived therefrom. In some embodiments, the difference in values may be determined and analyzed.

Figure 7:
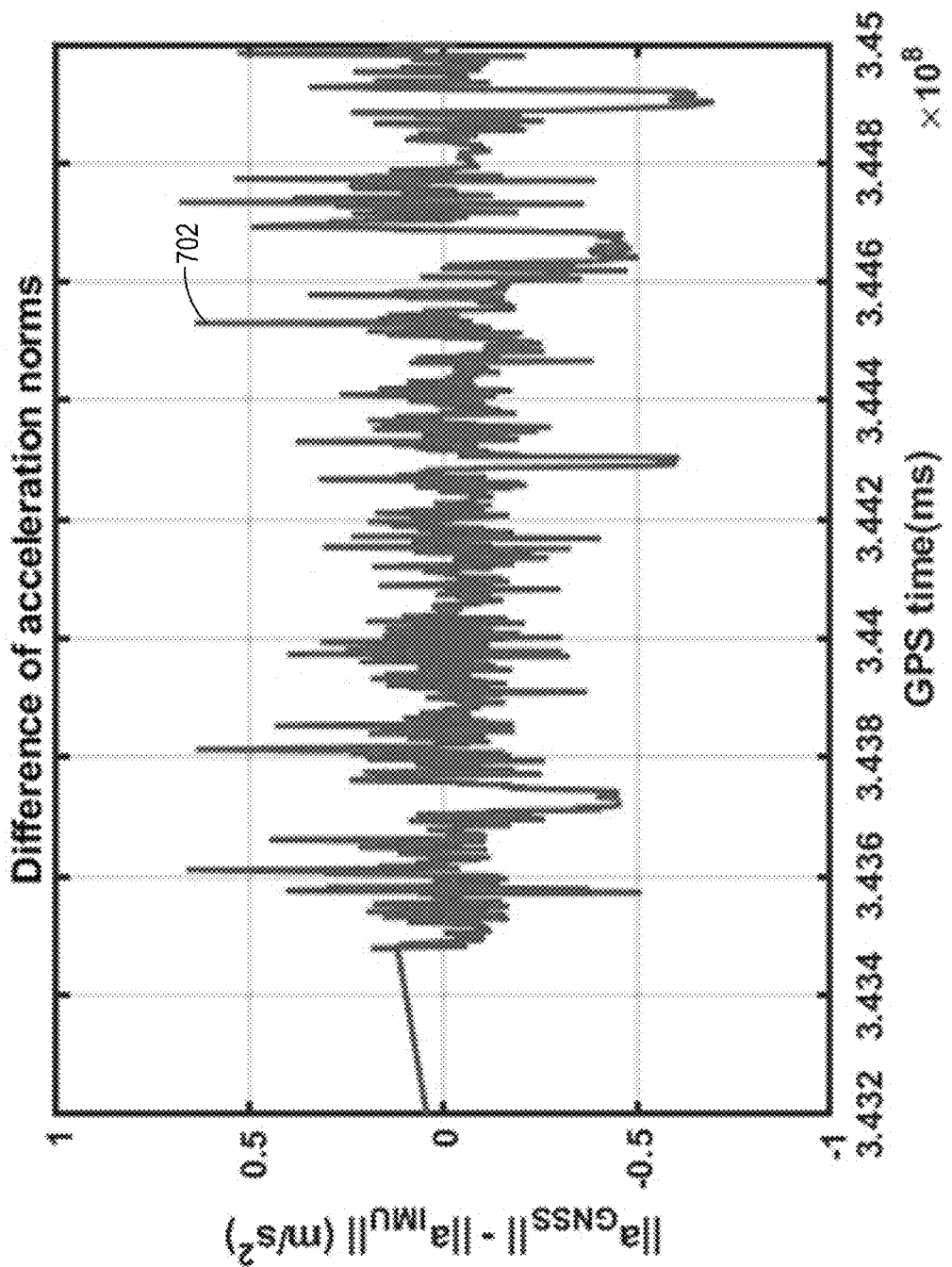
FIG. 7 illustrates a difference of normalized GNSS acceleration and normalized MEMS sensor accelerations.

FIG. 7 illustrates a graph of a difference of normalized GNSS acceleration data and normalized motion sensor acceleration data over time. Specifically, the graph plots a difference 702 of GNSS acceleration data minus the motion sensor acceleration data in m/s$^2$ over a time period measured in ms. FIG. 7 illustrates an exemplary data set between 1 to −1 meters per second per second with the majority of the data between +/−0.5 m/s$^2$. This type of data distribution could also be an indication that there is consistency in the acceleration data and therefore no spoofing. According to some embodiments, an analysis of the data represented in FIG. 7 may result in a determination that a "healthy" condition exists, in which the difference is below a threshold and represents inherent noise in the signals.

Figure 8:
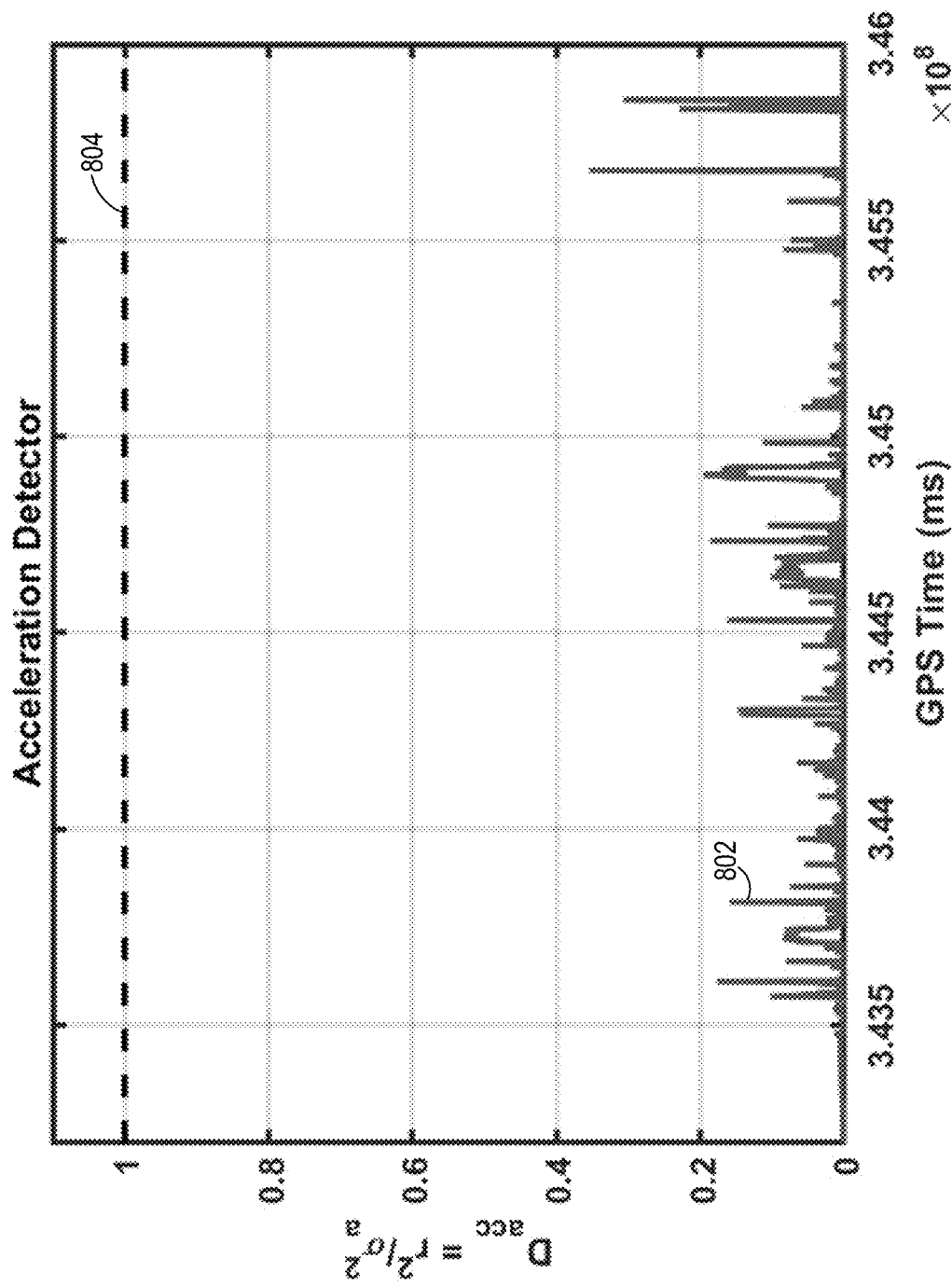
FIG. 8 illustrates a graph of an acceleration detector.

FIG. 8 illustrates a graph of an acceleration detector that may be used in some embodiments. FIG. 8 shows the differences between the GNSS acceleration and motion sensor acceleration, similar to FIG. 7, but with some additional filtering to remove some time periods with high velocity uncertainty. This filtering sets a threshold for velocity uncertainty for GNSS acceleration to only consider time periods with low velocity uncertainty instead of cases with bad geometry.

FIG. 8 illustrates a difference in acceleration ($D_{acc}$) that can be represented by the following equation:

$$D_{acc} = \frac{r^2}{\sigma_a^2},$$

where r is determined from GNSS acceleration, $a_{GNSS}$, and IMU sensor acceleration $a_{IMU}$ as follows:

$$r = \|a_{GNSS}\| - \|a_{IMU}\|,$$

and $\varphi_a$ is determined as:

$$\sigma_a = \frac{d}{dt} HEVE.$$

In the latter equation, HEVE is a horizontal estimated velocity error. FIG. 8 illustrates exemplary healthy conditions because the plot of $D_{acc}$ values 802 does not exceed a given threshold 804. The representations illustrated in FIG. 8 would indicate healthy conditions.

Figure 9:
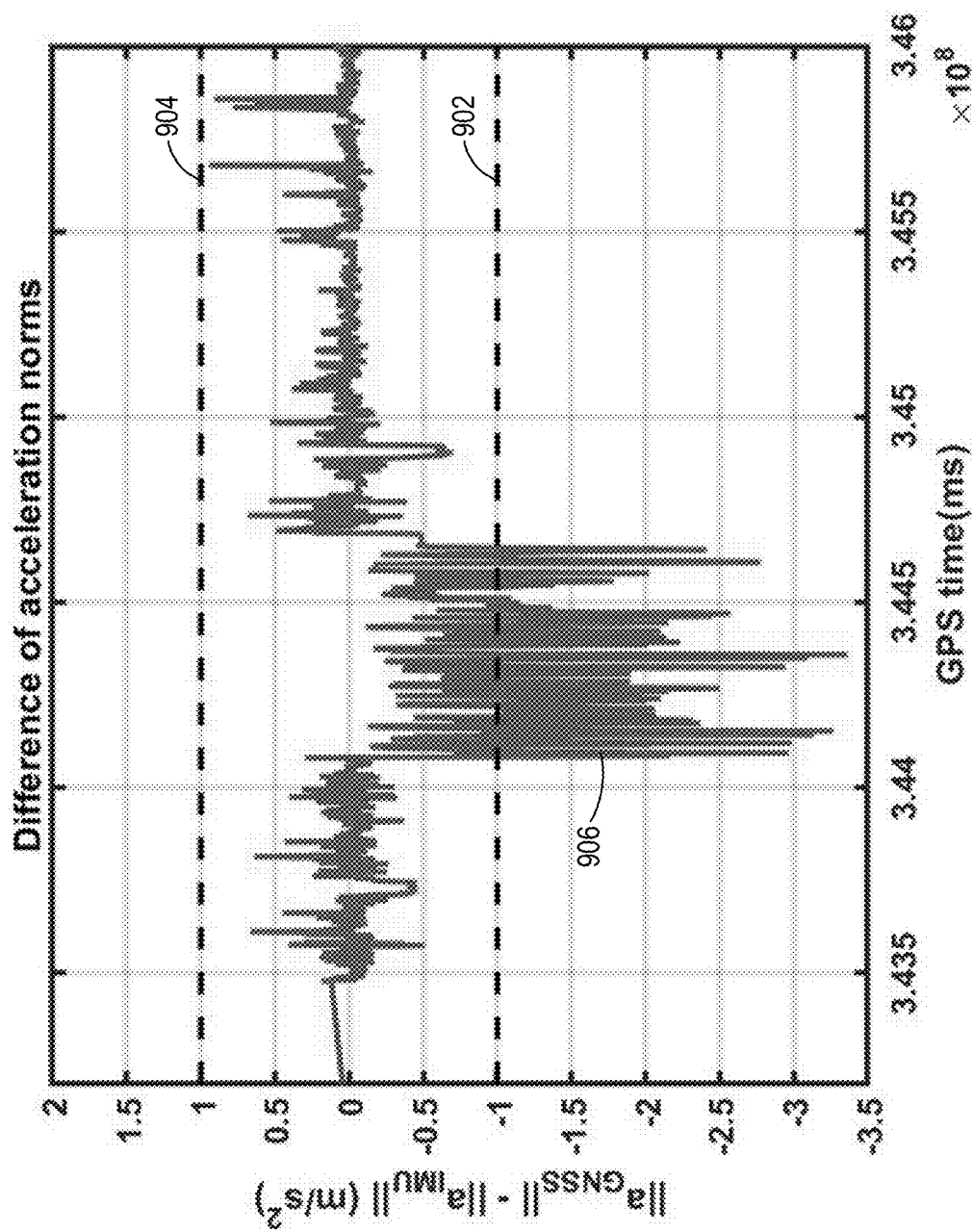
FIG. 9 illustrates a difference of normalized GNSS acceleration and normalized MEMS sensor accelerations showing potential spoofing.

FIG. 9 illustrates a difference of normalized GNSS acceleration and normalized motion sensor accelerations showing potential spoofing. Similar to the graph in FIG. 7, FIG. 9 plots a difference of GNSS acceleration data minus the motion acceleration data in m/s$^2$ over a time period measured in ms. FIG. 9 illustrates an exemplary data set between a lower threshold 902 of −1 m/s$^2$ and an upper threshold 904 at 1 m/s$^2$. The thresholds listed are merely exemplary and different thresholds can be selected, as previously described. In some instances the upper and lower thresholds can be different magnitudes. In FIG. 9, time period exemplifies potential spoofing because the difference plot 906 exceeds a threshold, specifically the lower threshold 902.

The difference plot 906 shown in FIG. 9 can be expected in the real world because the GNSS antenna and receiver of a mobile device will normally receive authentic GNSS signals providing typical acceleration difference that can be well-modeled. Those authentic GNSS signals can be overcome by a spoofed signal and the GNSS receiver will align to that signal and produce a solution based on that signal while the spoofed signal has captured the receiver. Once the user spoofer is turned off, or the equipment is outside the range of the spoofer it is expected it will receive the authentic GNSS signal again.

The techniques described herein can be used to detect any time that there is a mismatch between acceleration magnitude from either the GNSS signal submission or the motion sensor signal. So if the mobile device (e.g., vehicle) turns a corner or linearly accelerates or decelerate, there is a change of a magnitude of acceleration. Because most instances of spoofing currently involve installed (mobile) spoofers, a spoofer will typically not target and follow a specific mobile device. According to some embodiments, differences in acceleration over a time period can be analyzed, as previously described, to detect a difference in accelerations signals caused by fixed spoofer in specific regions. Other embodiments may utilize a more sensitive version of these comparison techniques (e.g., utilizing more sensitive receivers, more sensitive thresholds, etc.) to detect mobile spoofers.

The techniques disclosed herein can be used alone or in combination with other techniques to detect marginal cases where a spoofer signal is being broadcast but the signal strength may not be significantly different than authentic GNSS signals that it is obvious that that GNSS signal is being spoofed.

According to some embodiments, detection of mobile spoof or as may be made using the techniques herein to detect differences in the timing of certain movement. For example, a vehicle equipped to employ the techniques herein may detect a difference in acceleration related to the spoofer's GNSS observed dynamics versus the users sensor-observed dynamics (e.g., observing a turn using motion sensor data while GNSS spoofer observes stationary). Delays in the corresponding movement in the GNSS data (after accounting for differences in locations of the motion sensor and GNSS receiver on the vehicle) may suggest a mobile spoofer may be located on a pursuing vehicle.

Figure 10:
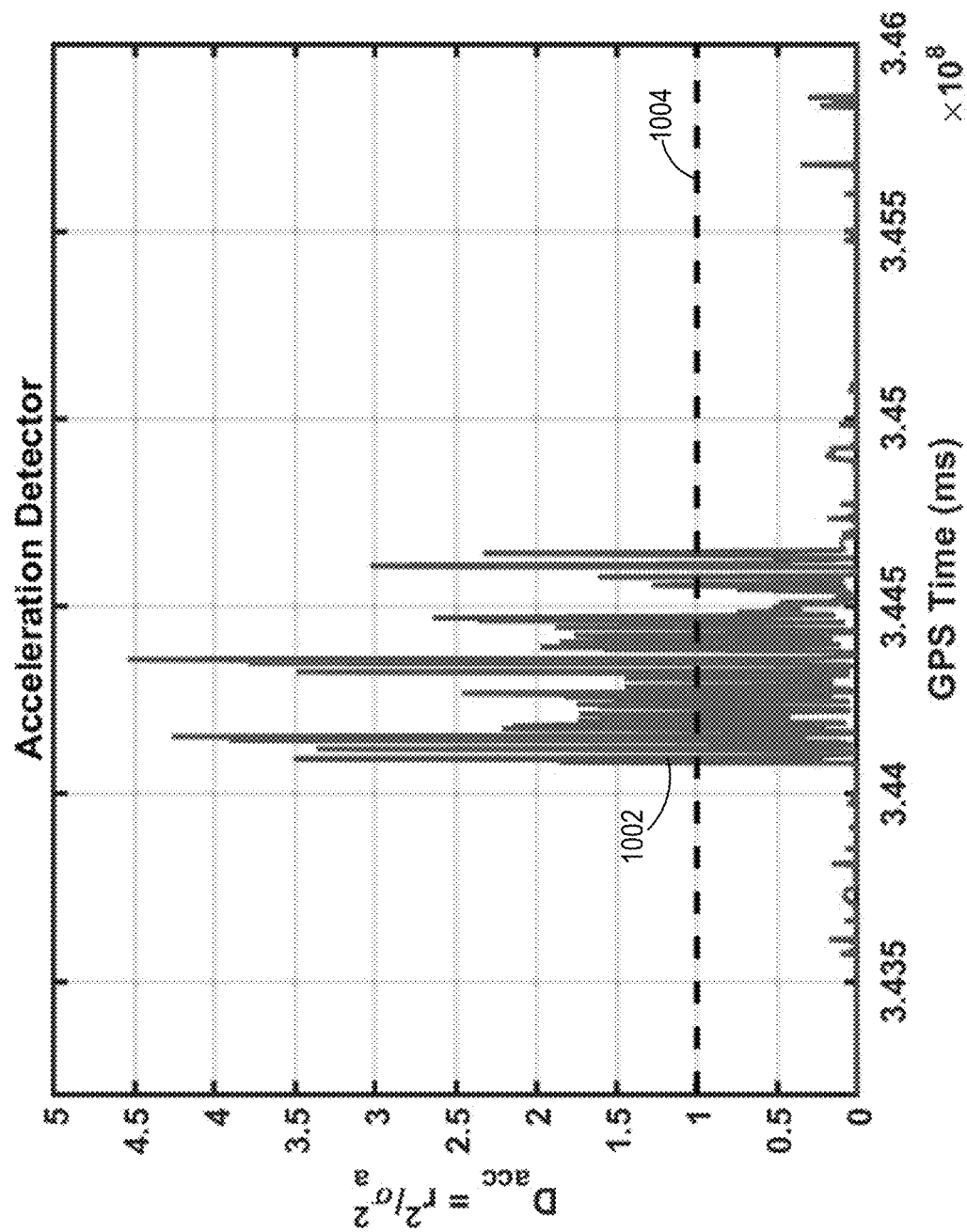
FIG. 10 illustrates a graph of an acceleration detector showing potential spoofing.

FIG. 10 illustrates a graph of an acceleration detector analyzing the data plotted in the graph of FIG. 9 and showing potential spoofing, according to an embodiment. FIG. 10 is similar to the graph in FIG. 8 of a plot of $D_{acc}$ over time in ms. However, in FIG. 10 the plot of difference 1002 in acceleration data shows potential spoofing during the time period of approximately 3.441 to 3.446×10$^8$ ms. Here, the potential spoofing is detected because the difference in that time period exceeds the upper threshold 1004.

Figure 11:
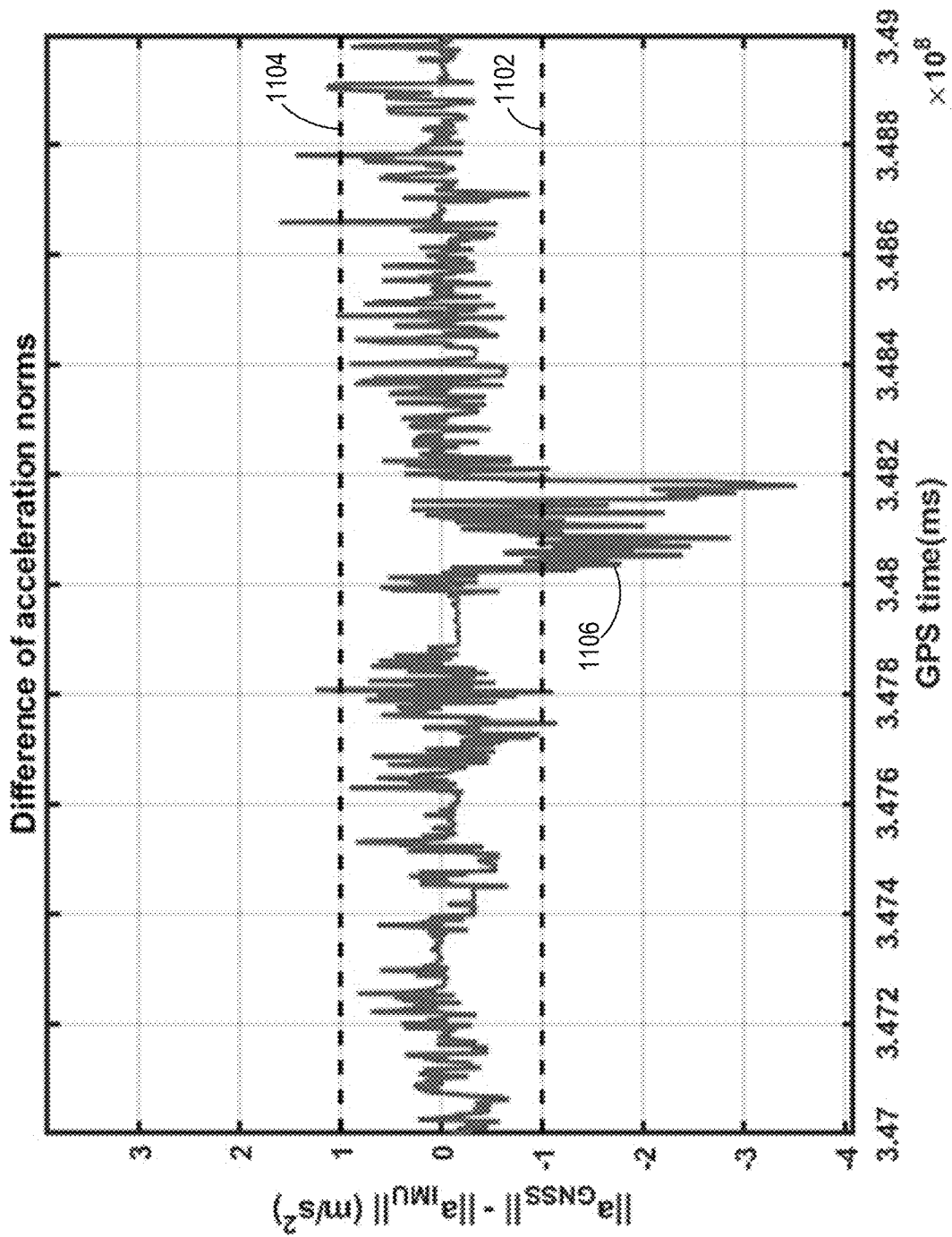
FIG. 11 illustrates a difference of normalized GNSS acceleration and normalized MEMS sensor accelerations showing potential spoofing.

FIG. 11 illustrates another example of a difference of normalized GNSS acceleration and normalized motion sensor accelerations, similar to FIGS. 7 and 9, where the graph plots a difference 1106 of GNSS acceleration data minus the motion acceleration data in m/s$^2$ over a time period measured in ms. FIG. 11 illustrates a lower threshold 1102 at −1 m/s$^2$ and an upper threshold 1104 at 1 m/s$^2$. Again, other threshold values can be used. Unlike FIG. 7, and similar to FIG. 9, the difference plot 1106 of normalized GNSS acceleration data and normalized motion sensor acceleration data in FIG. 11 exceeds a threshold (specifically the lower threshold 1102) for a time period between 3.48-3.482×10$^8$ milliseconds. Again, this can be an indication of spoofing of the GNSS signal.

Although the embodiments described with respect to FIGS. 4-11 are primarily directed toward acceleration data obtained by one or more motion sensors (e.g., an IMU, camera, etc.), embodiments are not so limited. Embodiments may vary, for example, by using one or more additional or alternative type(s) of motion data used and/or the type(s) of sensors used. Moreover, mobile devices may vary in the types of motion sensors they have, thereby enabling different mobile device types to employ different spoofing detection techniques as described herein.

For example, according to some embodiments in which the mobile device comprises a vehicle, a motion sensor may comprise an odometer and/or speedometer. As such, output from the odometer (e.g., differential wheel ticks (DWT)) and/or speedometer indicative of vehicle motion may be compared with motion of the vehicle as determined using GNSS data. That is, GNSS-detected changes in position, velocity, and/or speed over a period of time can be compared with accumulated odometer wheel ticks and/or speedometer output over the same period of time to determine whether there are any threshold differences in the position, velocity, and/or speed between the GNSS data and the odometer/speedometer data.

Additionally or alternatively, some embodiments may track an offset between the location of a GNSS receiver and one or more motion sensors to determine whether any changes occur in the offset (e.g., beyond a threshold value). That is, for embodiments in which the mobile device comprises a vehicle, vessel, airplane or the like (e.g., embodiments where there may be a detectable difference in the fixed locations of a GNSS receiver and motion sensor relative to the mobile device) detected position, velocity, and/or acceleration from the GNSS receiver and motion sensor can be compared to ensure no changes in this offset occur beyond a threshold. Such embodiments could involve solving for attitude and determining whether a shift in GNSS solution to this attitude occurs beyond a threshold value. In such embodiments, sensors may be initialized at a Zero Velocity Update (ZUPT) and\or at a known authentic GNSS initialization location.

Additionally or alternatively, some embodiments may apply a non-holonomic constraint (NHC) for a motion sensor having a fixed location on a mobile device. In such embodiments, a spoofing condition may be detected if residuals become unexpectedly larger than a threshold.

Additionally or alternatively, some embodiments may compare GNSS data with map data to help identify spoofing. For example, for terrestrial mobile devices such as vehicles, map data can be used to determine whether a GNSS solution follows changes in altitude that correspond to the latitude and longitude of the mobile device. Additionally or alternatively, altitude can be verified using a barometric pressure sensor. If changes in altitude as detected by a barometric pressure sensor match changes in altitude as provided in a GNSS solution, then map data may be disregarded. (However, in some embodiments, the inconsistency can be noted and stored/shared among devices to flag the inconsistency with the map data.) Otherwise, if data from the barometric pressure sensor matches map data corresponding to the location of the mobile device, but the GNSS solution indicates a different altitude (e.g., beyond a threshold), the condition may be indicative of GNSS spoofing.

Additionally or alternatively, some embodiments may employ measurement-level detection. For example, some embodiments may leverage a non-line-of-sight (NLOS) indication for one or more GNSS satellites, indicating one or more GNSS satellites for which GNSS signals may be weak or missing. Such an indication may be obtained, for example, from another process, device, or system of the mobile device, from a separate device or service, or the like, which may make the determination based on 3D buildings or other nearby objects that can block GNSS signals. Embodiments may use this NLOS indication to define a hypothesis of expected NLOS satellites and determine a confidence of detected spoofing based at least in part on the NLOS indication. For example, the confidence may be a function of lock detected, C/No, carrier phase lock per NLOS, such that the confidence of GNSS spoofing increases with the number of expected NLOS satellites for which the GNSS receiver has a good lock, strong C/No and carrier phase lock, etc. According to some embodiments 3-D maps or crowd-sourced observations to obtain the NLOS indication by providing a list of LOS\NLOS for given urban locations and then making a detector based on mismatch of expected signal mask.

An example of how NLOS information may be leveraged to determine whether spoofing is occurring is described below with respect to Table 1.

TABLE 1

|  | $SV_1$ | $SV_2$ | $SV_3$ | $SV_4$ | $SV_5$ | $SV_6$ |
|---|---|---|---|---|---|---|
| PLOS | 0.99 | 0.99 | 0.99 | 0.01 | 0.01 | 0.5 |
| C/No Expected | x dB | x − 3 dB | x − 3 dB | x − 10 dB | x − 10 dB | x − 6 dB |
| $Ex_1$ | — | 0 dB | +1 dB | +1 dB | −1 dB | +2 dB |
| $Ex_2$ | — | 0 dB | +2 dB | +11 dB | +9 dB | +5 dB |

Table 1 shows example NLOS-related values for satellites $SV_1$ to $SV_6$. In this example, satellites $SV_1$ is directly overhead a GNSS receiver, while other satellites are at other locations in the sky from the perspective of the GNSS receiver, some of which are blocked by buildings or other obstructions. As shown in the second row of Table 1, the LOS probability (PLOS), indicates that $SV_1$ to $SV_3$ are most likely LOS, that $SV_3$ and $SV_4$ are most likely NLOS, and $SV_6$ are has an equal likelihood of being LOS or NLOS. The PLOS value for each satellite may be provided by 3D map matching, ray tracing, shadow determination, or crowd-sourced mapping.

The third row of Table 1 shows expected C/No values. (Alternative embodiments may use other metrics of signal strength, such as SNR values.) These expected values can be obtained from an open sky model, lookup table, observed and modeled attenuation, in view of respective PLOS values for each satellite. Here, values are provided with respect to a value "x" which may represent the expected C/No value of the strongest satellite. (Because $SV_1$ is directly overhead in this example, it has value x.) In view of respective positions in the sky and PLOS, $SV_2$ and $SV_3$ are expected to have relatively strong signals, and therefore are only 3 dB below x. On the other hand, because satellites, $SV_4$ and $SV_5$ are likely obstructed (e.g., likely NLOS because they have a low PLOS value), they are expected to experience a much greater drop in strength (10 dB) with respect to x. The expected C/No value of satellite $SV_6$ falls in between.

The fourth and fifth rows of Table 1 show differences in measured and expected C/No values in two different examples. In the first example, labeled $Ex_1$ (row 4), no spoofing is taking place. As such, measured values for satellites $SV_2$ and $SV_3$ are similar to expected values, differing by 2 dB or less from the expected C/No values. However, in the second example, labeled Ext (row 5), spoofing is occurring. Thus, the signals received for NLOS satellites $SV_4$ and $SV_5$ are not attenuated as expected. Instead, measured C/No values are similar to expected values are 9 and 11 dB stronger. The measured value for $SV_6$, too, as much stronger than expected. When measured signal strength values (C/No, SNR, etc.) vary from expected values by threshold amount (e.g., 3 dB, 4 dB, 5 dB, etc.) a GNSS receiver can determine that spoofing is occurring (e.g., with all satellites, or at least the satellites for which the measured value varies from the expected value by the threshold amount). Variance may be determined in different ways. According to some embodiments, spoofing may be determined if the C/No values from a threshold number or percentage of satellites vary by a threshold amount. Additionally or alternatively, spoofing may be determined if a variance metric (e.g., mean, standard deviation, etc.) of the C/No values of the satellites exceed a threshold. Some embodiments may further utilize a probability model in which a probability of the number of satellites that vary from expected values by at least the threshold amount is determined (e.g., based on historical and/or crowd-sourced data). In such embodiments, if the probability is below a threshold probability value, the GNSS receiver may determine that spoofing is occurring.

In some embodiments, such as embodiments or instances in which where PLOS may be unavailable, a similar technique may be used to determine whether spoofing may be occurring. For example, if the GNSS receiver has a rough estimate of its position in a location (e.g., a forest, a canyon, a dense urban environment, etc.) in which many obstructions significantly increase the likelihood that at least one satellite is NLOS, it may determine that spoofing occurs if signal strength values (C/No, SNR, etc.) for all satellites are approximately the same and/or do not reflect the significant attenuation that would be expected with one or more of the satellites view of the obstructions.

Depending on desired functionality, a mobile device may employ one or more responses if spoofing is detected. For example, according to some embodiments, a mobile device may ignore GNSS data and/or a GNSS-based position estimation if GNSS spoofing is detected. In such embodiments, the mobile device may rely on other, non-GNSS position determination techniques (e.g., RAT-based positioning, dead reckoning, visual odometry, visual-inertial odometry etc.) for a period of time, until GNSS spoofing is no longer detected. According to some embodiments, an indication of the detected GNSS spoofing may be provided to other processes, devices, and/or systems of the mobile device (e.g., from a GNSS receiver to an application processor and/or operating system of a mobile device comprising cellular phone, to other position-determination systems of a mobile device comprising a vehicle, etc.), to alert these other processes, devices and/or systems, which may allow them to operate differently (e.g., in a "safety mode" in which GNSS-based positioning is assumed to be incorrect). Additionally or alternatively, according to some embodiments, an indication of detected GNSS spoofing may be sent to a device separate from the mobile device (e.g., a remote server), which may track spoofing and/or alert other mobile devices of the GNSS spoofing.

Embodiments described herein for GNSS spoofing can be performed using software and/or hardware components of a mobile device. This can include hardware and/or software components of a GNSS receiver of a mobile device. Examples of such components are illustrated hereafter, with regard to FIGS. 13-16.

Figure 12A:
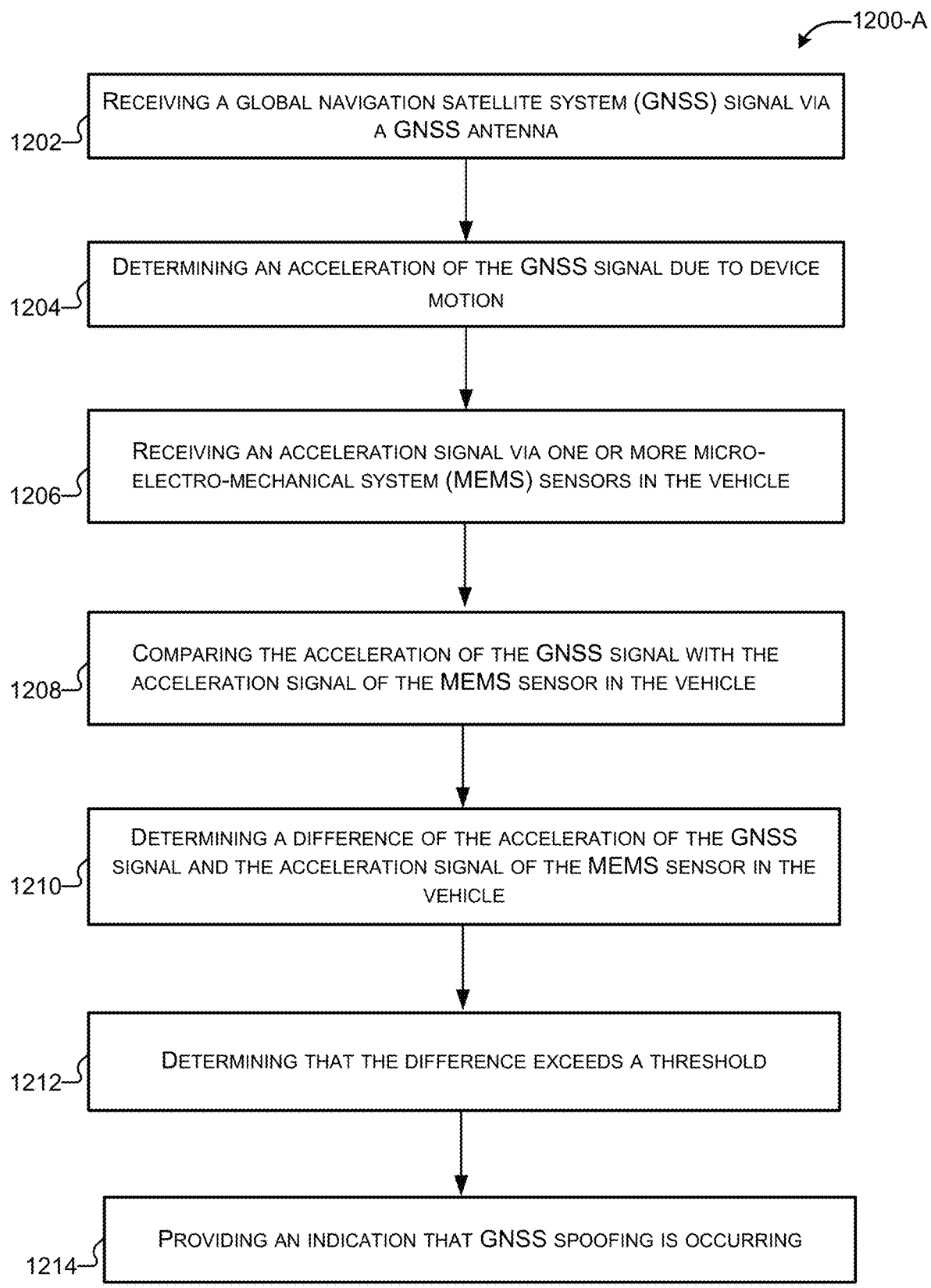
FIGS. 12A and 12B illustrates flow diagrams illustrating techniques for detecting possible spoofing of the GNSS signal, according to some embodiments.

FIG. 12A illustrates an exemplary flow for a first method 1200-A for detecting possible spoofing of the GNSS signal, according to an embodiment. Alternative embodiments may vary in function by combining, separating, or otherwise varying the functionality described in the blocks illustrated in FIG. 12A. Means for performing the functionality of one or more of the blocks illustrated in FIG. 12A may comprise hardware and/or software components of a UE, such as the UE 1300 illustrated in FIG. 13 and described below.

It can be further noted that although the first method 1200-A describes the determination and comparison of acceleration data (e.g., at blocks 1204-1210), embodiments are not so limited. As previously indicated, and as described in further detail with regard to FIG. 12B, embodiments may additionally or alternatively determine and compare alternative types of movement, as determined from GNSS and sensor. This can include, for example, velocity, speed, etc.

At block 1202, the functionality can include receiving a global navigation satellite system (GNSS) signal via a GNSS antenna. A means for performing the functionality of block 1202 can include, for example, a GNSS receiver 1380 of the UE 1300 illustrated in FIG. 13 and described below.

According to an embodiment a GNSS receiver may receive a first signal encoded with a first periodically repeating PN code from a first SV (e.g., SV1) and receive a second signal encoded with a second periodically repeating PN code from a second SV (e.g., SV2). To acquire the first signal, such a receiver may detect a Doppler frequency in the received signal while correlating code and/or time-shifted versions of a locally generated code sequence with the received first signal. In a particular example where the first SV transmits a GPS signal encoded with a periodically repeating PN code 1,023 chips long, the received signal may be correlated over as many as 1,023 versions of an associated locally generated code sequence, code and/or time-shifted in single chip increments.

In various embodiments, the GNSS receiver can include one or more antennas. If the GNSS receiver has multiple antennas and if the position of the antennas is such that there is an unobstructed line of sight (LOS) to the SVs then there are possibilities of detection of the spoofing based on the common bearing of the received GNSS signals and eliminating all the jammer signals simultaneously by appropriate combining of the receiver antennas to form a pattern null coincident with the jammer bearing.

One or more GNSS signals can be received via the GNSS antenna. The wireless signal can be converted to an electronic signal that is electronically communicated to the GNSS receiver. The electronic signal can pass through one or more filters. Means for performing the functionality of block 1202 can include, for example, one or more GNSS antennas 1382, a GNSS receiver 1380 of the UE 1300 illustrated in FIG. 13 and described below.

At block 1204, the functionality can include determining an acceleration of the GNSS signal due to device motion. In some embodiments, the device motion can be attributed to motion of a vehicle. The technique can detect the velocity of the incoming GNSS signal. The acceleration can be determined by taking the derivative of the velocity. In various embodiments, the technique can include normalizing the acceleration of the GNSS signal to eliminate dependencies on a reference frame.

In various embodiments, the functionality can include determining a velocity of the vehicle using odometer data. Odometer data can provide distance over a time period to calculate velocity. The odometer velocity can be determined using differential wheel ticks over time. Traditional encoders can be used to count "ticks" while the wheel is spinning, each "tick" can indicate a fraction of a rotation. The tick count can be used along with known wheel radius over a determined time period to determine wheel linear speed.

$$\text{speed} = \frac{2\pi r \frac{ticks_{t1} - ticks_{t0}}{\text{ticks per revolution}}}{t_1 - t_0}$$

Vehicle systems communicate various speed signals (wheel speeds, drive axle speed, odometry, etc.) and dynamics signals (rotation rates, accelerations, etc.) throughout the vehicle for use in braking modulation (ABS), stability control systems, rollover detection systems, etc. These signals are often transmitted on a data bus such as Controller Area Network (CAN) to which a telematics or infotainment platform running one or more navigation algorithms is communicatively attached. These signals may be used by the navigation algorithms to improve navigation performance or for dead reckoning in challenging GNSS environments. According to some embodiments, these speed and dynamics signals (or their derivatives or integrals) may also be used to detect spoofing.

Means for performing the functionality of block 1204 can include, for example, a GNSS receiver 1380, processing units 1310, DSP 1320, a memory 1360 of the UE 1300 illustrated in FIG. 13 and described below.

At block 1206, the functionality can include receiving an acceleration signal via one or more micro-electro-mechanical system (MEMS) sensors (e.g., an IMU, as previously described) in the vehicle. This may occur during a window of time for which the acceleration due to device motion determined at block 1204, enabling a comparison of GNSS-based and MEMS-based motion data in the manner as previously described with regard to FIG. 6. The synchronization of the capture of both types of motion data may be based on GNSS time and/or a local clock of the GNSS receiver or mobile device. The MEMS sensors can include one or more accelerometers capable of generating an electrical signal in response to either dynamic acceleration (i.e., shock or vibration) and/or static acceleration (i.e., inclination or gravity). As previously noted, static acceleration (e.g., due to gravity) as measured by MEMS sensors can be accounted for when comparing acceleration data from the MEMS sensors with GNSS-based acceleration data obtained at block 1204. In some embodiments, the output signal is a voltage. The voltage is proportional to acceleration. In some embodiments, the voltage output can be a pulse-width-modulation (PWM) proportional to acceleration. This information can, for example, provide acceleration data similar to that previously described with regard to FIGS. 5-7. Moreover, as previously noted, in various embodiments, the technique can include normalizing the acceleration of the MEMS acceleration signals to eliminate dependencies on a particular reference or coordinate frame.

In various embodiments, the GNSS antenna and the one or more MEMS sensors are co-located. In various embodiments, the GNSS antenna and the one or more MEMS sensors are offset by a known distance. In various embodiments, the MEMS sensors are calibrated using a non-GNSS based technique.

Means for performing the functionality of block 1206 can include, for example, one or more processing units 1310, DSP 1320, a memory 1360 of the UE 1300 illustrated in FIG. 13 and described below.

At block 1208, the functionality can include comparing the acceleration of the GNSS signal with the acceleration signal of the MEMS sensor in the vehicle. As noted previously with regard to FIGS. 5-7, in various embodiments, the comparison can be conducted after the GNSS acceleration and MEMS signals have been normalized, which can facilitate comparison across different coordinate frames. In some embodiments, the comparison can be conducted after additional filtering to remove some time periods with high velocity uncertainty. This filtering sets a threshold for velocity uncertainty for GNSS acceleration to only consider time periods with low velocity uncertainty instead of cases with bad geometry.

In various embodiments, the one or more MEMS sensors detect acceleration in three dimensions. The plurality of acceleration signals can be received via one or more MEMS sensors every tenth of a second.

In various embodiments, the functionality can include comparing acceleration derived from the velocity as determined from the GNSS signal with acceleration derived from the velocity of the vehicle as determined using one or more vehicle systems that communicate various speed signals, as previously described. In various embodiments, the magnitude of the velocity of the vehicle, as determined using one or more vehicle systems, may be obtained from the speed of the vehicle, as determined by the one or more vehicle systems.

Means for performing the functionality of block 1208 can include, for example, one or more processing units 1310, DSP 1320, a memory 1360 of the UE 1300 illustrated in FIG. 13 and described below.

At block 1210, the functionality can include determining a difference of the acceleration of the GNSS signal and the acceleration signal of the MEMS sensor in the vehicle. As previously noted with regard to FIGS. 6 and 7, in various embodiments, the difference in acceleration can be determined after the GNSS acceleration and MEMS acceleration have been normalized. In some embodiments, the difference can be determined after additional filtering to remove some time periods with high velocity uncertainty (e.g., uncertainty exceeding a threshold value). The difference can be stored in one or more memories.

Means for performing the functionality of block 1210 can include, for example, one or more processing units 1310, DSP 1320, a memory 1360 of the UE 1300 illustrated in FIG. 13 and described below.

At block 1212, the functionality can include determining that the difference exceeds a threshold. As previously explained with regard to FIG. 7, in some embodiments, the threshold can be fixed. Alternatively, the threshold can be variable as conditions change. In some embodiments the upper and lower thresholds can be symmetrical around a center point (e.g., ±1 meters per second per second). In various embodiments, the upper threshold can vary from the lower threshold around a center point. In some embodiments, the functionality can include measuring the duration that the difference exceeds a threshold.

Means for performing the functionality of block 1212 can include, for example, one or more processing units 1310, DSP 1320, a memory 1360 of the UE 1300 illustrated in FIG. 13 and described below.

At block 1214, the functionality can include providing an indication that GNSS spoofing is occurring. The indication can be an electronic message to a navigation and/or other system/component of the vehicle, an operating system, a user interface, a remote device, and/or the like. In some embodiments, the indication of potential spoofing may comprise and/or activate one or more measures to mitigate the impact of such spoofing, such as disregarding spoofed signals and/or obtaining positioning data from non-spoofed GNSS and/or other sources. In some embodiments, an indication that GNSS spoofing is occurring will not occur unless the threshold is exceeded for a given duration of time.

Means for performing the functionality of block 1214 can include, for example, one or more processing units 1310, DSP 1320, a memory 1360 of the UE 1300 illustrated in FIG. 13 and described below.

In various embodiments, the technique can include measuring a horizontal estimated position error from a plurality of global navigation satellite system (GNSS) signals. The technique can include detecting that the horizontal estimated velocity error exceeds a threshold error value.

It should be appreciated that the specific operations illustrated in FIG. 12A provide particular techniques for enhanced navigation techniques according to various embodiments of the present disclosure. Other sequences of operations may also be performed according to alternative embodiments. For example, alternative embodiments of the present invention may perform the operations outlined above in a different order. Moreover, the individual operations illustrated in FIG. 12A may include multiple sub-operations that may be performed in various sequences as appropriate to the individual operations. Furthermore, additional operations may be added or removed depending on the particular applications. One of ordinary skill in the art would recognize many variations, modifications, and alternatives.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Figure 12B:
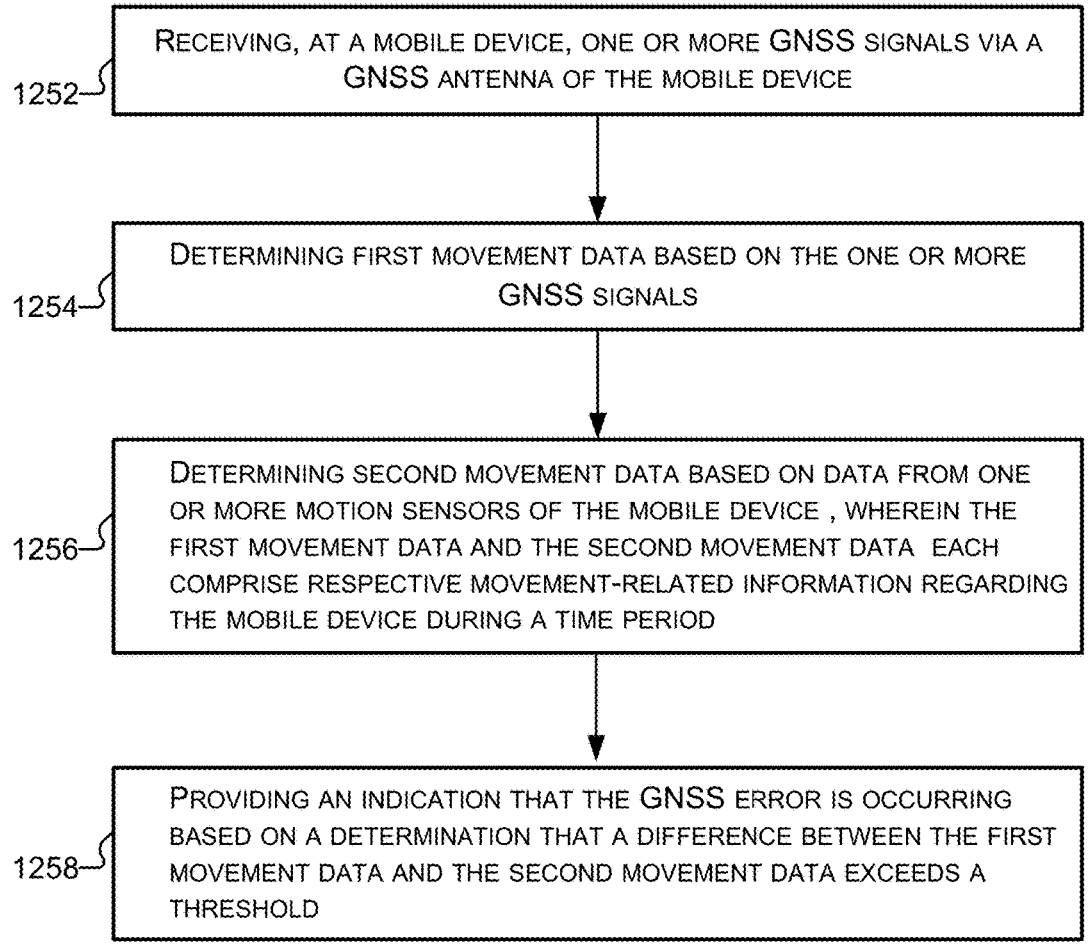

FIG. 12B illustrates an exemplary flow for a second method 1200 for detecting possible error of one or more GNSS signals, according to an embodiment. Again, alternative embodiments may vary in function by combining, separating, or otherwise varying the functionality described in the blocks illustrated in FIG. 12B. Means for performing the functionality of one or more of the blocks illustrated in FIG. 12B may comprise hardware and/or software components of a UE, such as the UE 1300 illustrated in FIG. 13 and described below.

At block 1252, the functionality comprises receiving, at a mobile device, one or more GNSS signals via a GNSS antenna of the mobile device. As noted previously with regard to block 1202 of FIG. 12A, this may comprise correlating code and/or time-shifted versions of a locally generated code sequence with a PN code of the one or more GNSS signals. A means for performing the functionality of block 1252 can include, for example, a GNSS receiver 1380 of the UE 1300 illustrated in FIG. 13 and described below. The functionality at block 1252 can generally echo that of block 1202 described previously with regard to FIG. 12A.

At block 1254, the functionality comprises determining first movement data based on the one or more GNSS signals. In some embodiments, similar to the functionality of block 1204 of FIG. 12A, movement data can be derived from the one or more GNSS signals. The movement data may comprise data indicative of movement (or lack of movement) of the mobile device, such as a change in position, a velocity, acceleration, etc. As previously noted with regard to FIGS. 2 and 4, for example, acceleration may be derived from GNSS velocity determined from received GNSS signals. Velocity may be obtained, for example, using a time-derivative of consecutive positions, using Doppler measurements (e.g., Doppler shift), using time-differenced carrier phase (TDCP) methods of the one or more GNSS signals, or the like. Where multiple GNSS signals are received, multiple Doppler measurements may be combined (e.g., averaged) to get a combined velocity based on multiple signals/satellites. Means for performing the functionality of block 1254 can include, for example, a GNSS receiver 1380, processing units 1310, DSP 1320, and/or a memory 1360 of the UE 1300 illustrated in FIG. 13 and described below.

At block 1256, the functionality comprises determining second movement data based on data from one or more motion sensors of the mobile device, wherein the first movement data and the second movement data each comprise respective movement-related information regarding the mobile device during a time period. As previously noted (e.g., with regard to FIG. 5) motion sensors of a mobile device may comprise an IMU, camera, odometer, or the like. With regard to an IMU, acceleration due to gravity may be accounted, as noted in the previously-described embodiments. The movement-related information may comprise information regarding any of movement (or lack of movement) of the mobile device during the period of time. According to some embodiments, the first movement data, the second movement data, or both, comprise data indicative of an acceleration of the mobile device, a velocity of the mobile device, a rotation of the mobile device, or a combination thereof. As previously noted (e.g., with regard to FIGS. 6 and 7), this can be obtained and/or derived from GNSS and/or data from motion sensors (accelerometer data, and gyroscope data, magnetometer data, etc.). Means for performing the functionality of block 1256 can include, for example, one or more processing units 1310, DSP 1320, sensor(s) 1340, a memory 1360 of the UE 1300 illustrated in FIG. 13 and described below.

At block 1258, the functionality comprises providing an indication that GNSS error is occurring based on a determination that a difference between first movement data and the second movement data exceeds a threshold. As previously described with regard to FIG. 7, the difference may comprise, for example, differences in motion between first movement data and second movement data, and/or a motion in one source (first movement data or second movement data) and a lack of motion the other. Moreover, as previously noted, vector components from the movement data may be normalized to facilitate in the comparison of the first movement data and the second movement data. As also noted, comparisons can be made of different vector components in different coordinate frames, for example. According to some embodiments, the determination that the difference between first movement data and the second movement data exceeds the threshold comprises normalizing the first movement data, the second movement data, or both. According to some embodiments, the determination that the difference between first movement data and the second movement data exceeds the threshold may comprise measuring a horizontal estimated position error from a plurality of global navigation satellite system (GNSS) signals, and detecting that the horizontal estimated position error exceeds a threshold error value.

As previously noted, some embodiments may compensate for a distance between the GNSS antenna/receiver receiving the one or more GNSS signals and the one or more sensors providing the data from which the second movement data is based. As such, in some embodiments of the method 1200-B, the GNSS antenna and the one or more motion sensors are offset by a known distance. In such embodiments, the determination that the difference between first movement data and the second movement data exceeds the threshold may comprise determining that the first movement data and the second movement data reflect an offset distance that is different than the known distance by more than a threshold value.

The one or more motion sensors used may vary, depending on desired functionality an application. For example, according to some embodiments, the mobile device comprises a vehicle. In such embodiments, the one or more motion sensors may comprise an odometer, and the determination that the difference between first movement data and the second movement data exceeds the threshold comprises determining a difference between a velocity obtained from the odometer and a velocity based on the one or more GNSS signals exceeds a threshold value. Additionally or alternatively, according to some embodiments the one or more motion sensors may comprise a barometric sensor. In such embodiments, the determination that the difference between first movement data and the second movement data exceeds the threshold may comprise determining a difference between a change in altitude obtained from the barometric sensor and a change in altitude based on the one or more GNSS signals exceeds a threshold value. According to some embodiments the one or more motion sensors may comprise one or more cameras which can measure rotation, velocity, distance traveled, and/or and other motion-related data (e.g., based on a comparison of movement between successive frames, blur within one or more frames, and/or other processing techniques), which can be used as described herein.

As previously indicated, providing an indication that GNSS error (e.g., spoofing) is occurring may vary, depending on desired functionality and application. According to some embodiments, this may comprise a GNSS receiver of a UE providing the indication to an application processor and/or operating system of the UE. Additionally or alternatively, providing the indication may comprise providing the indication to a navigation application executed by the UE. Additionally or alternatively, providing the indication may comprise notifying the user, notifying another device (e.g., a remote UE, server, etc.), or the like. According to some embodiments, providing the indication that the GNSS error is occurring may be further based on determination that the first movement data is inconsistent with map data.

Means for performing the functionality of block 1208 can include, for example, one or more processing units 1310, DSP 1320, a memory 1360, and/or a wireless communication interface 1330 of the UE 1300 illustrated in FIG. 13 and described below.

Figure 13:
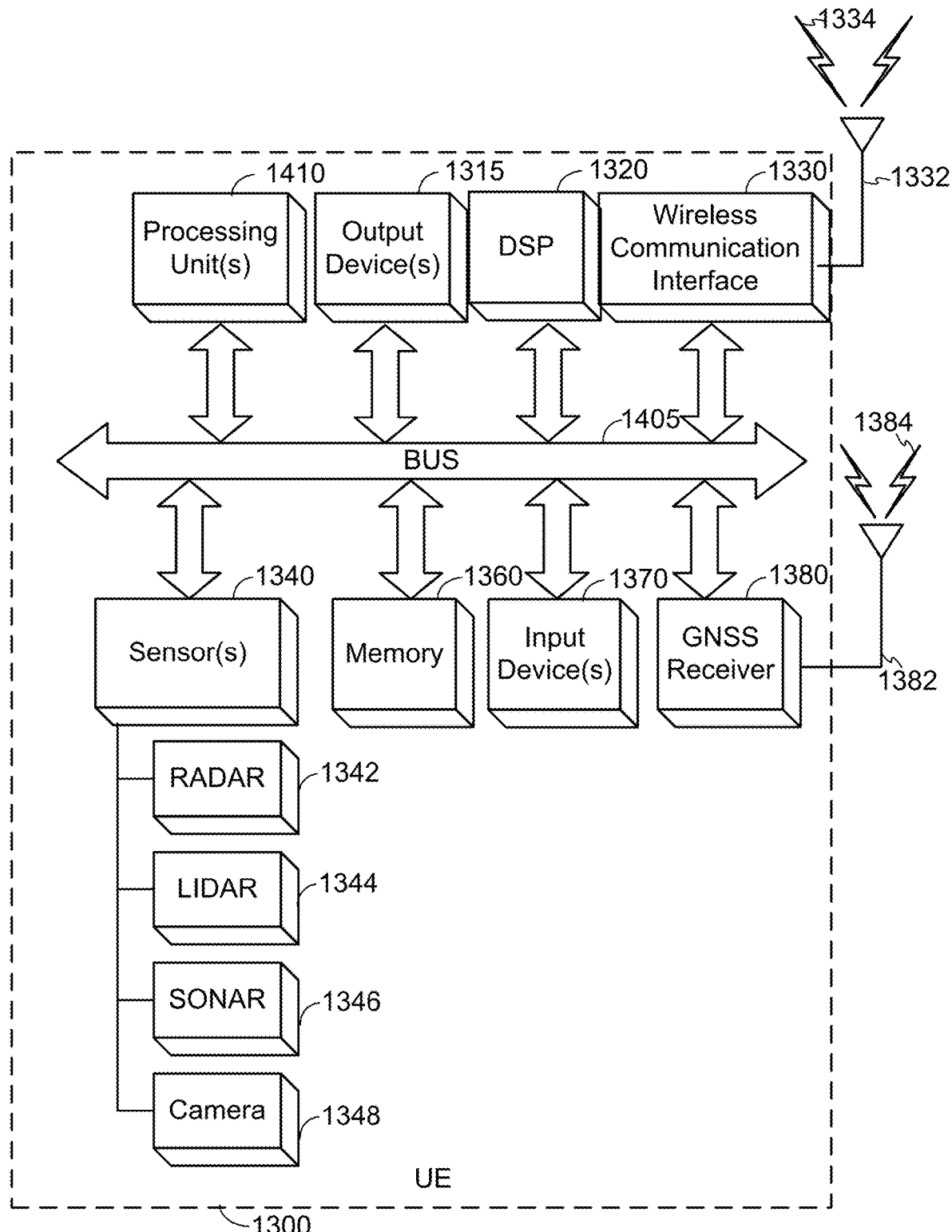
FIG. 13 is a block diagram of a mobile device, according to an embodiment.

FIG. 13 is a block diagram of an embodiment of a UE 1300, which can be utilized as described in the embodiments described herein and in association with FIGS. 1-12B. For example, the UE 1300 can perform one or more of the functions of methods 1200-A and/or 1200B of FIGS. 12A and 12B. It should be noted that FIG. 13 is meant only to provide a generalized illustration of various components of UE 1300, any or all of which may be utilized as appropriate. In other words, because UEs can vary widely in functionality, they may include only a portion of the components shown in FIG. 13. It can be noted that, in some instances, components illustrated by FIG. 13 can be localized to a single physical device and/or distributed among various networked devices, which may be disposed at different physical locations.

The UE 1300 is shown comprising hardware elements that can be electrically coupled via a bus 1305 (or may otherwise be in communication, as appropriate). The hardware elements may include a processing units 1310 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 13, some embodiments may have a separate DSP 1320, depending on desired functionality. The UE 1300 also may comprise one or more input devices 1370, which may comprise without limitation one or more touch screens, touch pads, microphones, buttons, dials, switches, and/or the like; and one or more output devices 1315, which may comprise without limitation, one or more displays, light emitting diodes (LEDs), speakers, and/or the like.

The UE 1300 might also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable the UE 1300 to communicate via the networks described herein with regard to FIG. 1. The wireless communication interface 1330 may permit data to be communicated with a network, base stations (e.g., eNBs, ng-eNBs, and/or gNBs), and/or other network components, computer systems, transmission/reception points (TRPs), and/or any other electronic devices described herein. The communication can be carried out via one or more wireless communication antenna(s) 1332 that send and/or receive wireless signals 1334.

Depending on desired functionality, the wireless communication interface 1330 may comprise separate TRPs to communicate with base stations (e.g., eNBs, ng-eNBs and/or gNBs) and other terrestrial TRPs, such as wireless devices and access points. The UE 1300 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16), and so on. A CDMA network may implement one or more radio access technologies (RATs) such as cdma2000, Wideband-CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, New Radio (NR) and so on. 5G, LTE, LTE Advanced, NR, GSM, and WCDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1300 can further include sensor(s) 1340. Such sensors may comprise, without limitation, one or more inertial sensors (e.g., radar 1342, LIDAR 1344, sonar 1346, accelerometer(s), gyroscope(s), and or other Inertial Measurement Units (IMUs)), camera(s) 1348, magnetometer(s), compass, altimeter(s), microphone(s), proximity sensor(s), light sensor(s), barometer, and the like, some of which may be used to complement and/or facilitate the functionality described herein.

Embodiments of the UE 1300 may also include a Global Navigation Satellite System (GNSS) receiver 1380 capable of receiving signals 1384 from one or more GNSS satellites using a GNSS antenna 1382 (which may be combined in some implementations with an antenna(s) 1332). Such positioning can be utilized to complement and/or incorporate the techniques described herein. The GNSS receiver 1380 can extract a position of the UE 1300, using conventional techniques, from GNSS satellites of a GNSS system, such as Global Positioning System (GPS), Galileo, GLObal NAvigation Satellite System (GLONASS), Compass, Quasi-Zenith Satellite System (QZSS) over Japan, Indian Regional Navigational Satellite System (IRNSS) over India, Beidou over China, and/or the like. Moreover, the GNSS receiver 1380 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The UE 1300 may further include and/or be in communication with a memory 1360. The memory 1360 may comprise, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the UE 1300 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the UE 1300 (e.g., using processing units 1310). In an aspect, then, such code and/or instructions can be used to configure and/or adapt a general-purpose computer (or other device) to perform one or more operations in accordance with the described methods.

Figure 14:
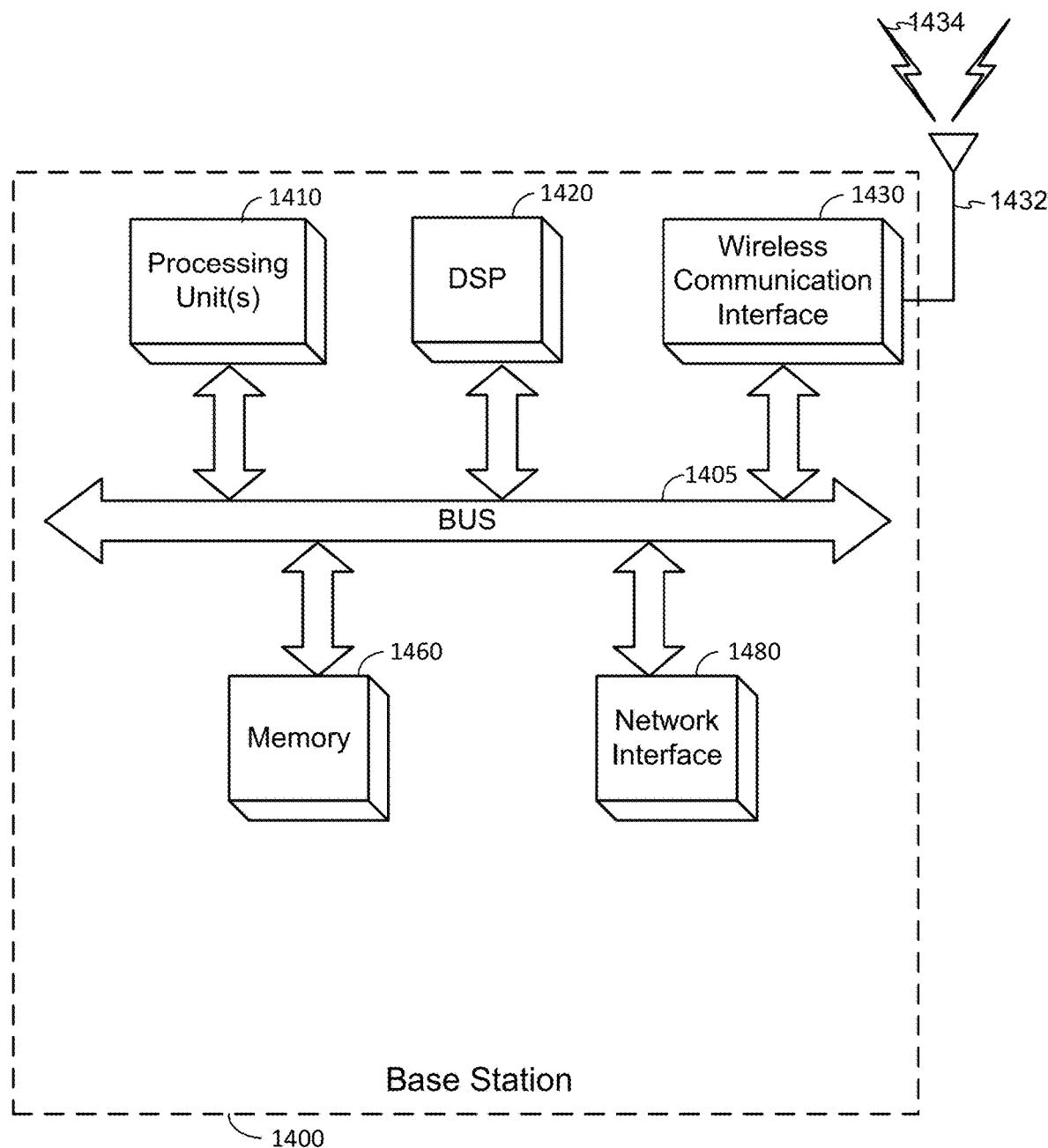
FIG. 14 is a block diagram of a base station, according to an embodiment.

FIG. 14 illustrates an embodiment of a base station 1400, which can be utilized as described herein above. For example, the base station 1400 can perform one or more of the functions of method 1200-A and/or 1200-B of FIGS.

12A and 12B. It should be noted that FIG. 14 is meant only to provide a generalized illustration of various components, any or all of which may be utilized as appropriate. In some embodiments, the base station 1400 may correspond to a gNB, an ng-eNB, and/or an eNB.

The base station 1400 is shown comprising hardware elements that can be electrically coupled via a bus 1405 (or may otherwise be in communication, as appropriate). The hardware elements may include a processing unit(s) 1410 which can include without limitation one or more general-purpose processors, one or more special-purpose processors (such as DSP chips, graphics acceleration processors, ASICs, and/or the like), and/or other processing structure or means. As shown in FIG. 14, some embodiments may have a separate DSP 1420, depending on desired functionality. Location determination and/or other determinations based on wireless communication may be provided in the processing unit(s) 1410 and/or wireless communication interface 1430 (discussed below), according to some embodiments. The base station 1400 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 1400 might also include a wireless communication interface 1430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 1400 to communicate as described herein. The wireless communication interface 1430 may permit data and signaling to be communicated (e.g. transmitted and received) UEs, other base stations (e.g., eNBs, gNBs, and ng-eNBs), and/or other network components, computer systems, and/or any other electronic devices described herein. The communication can be carried out via one or more wireless communication antenna(s) 1432 that send and/or receive wireless signals 1434.

The base station 1400 may also include a network interface 1480, which can include support of wireline communication technologies. The network interface 1480 may include a modem, network card, chipset, and/or the like. The network interface 1480 may include one or more input and/or output communication interfaces to permit data to be exchanged with a network, communication network servers, computer systems, and/or any other electronic devices described herein.

In many embodiments, the base station 1400 may further comprise a memory 1460. The memory 1460 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1460 of the base station 1400 also may comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the base station 1400 (and/or processing unit(s) 1410 or DSP 1420 within base station 1400). In an aspect, then, such code and/or instructions can be used to configure and/or adapt a general-purpose computer (or other device) to perform one or more operations in accordance with the described methods.

Figure 15:
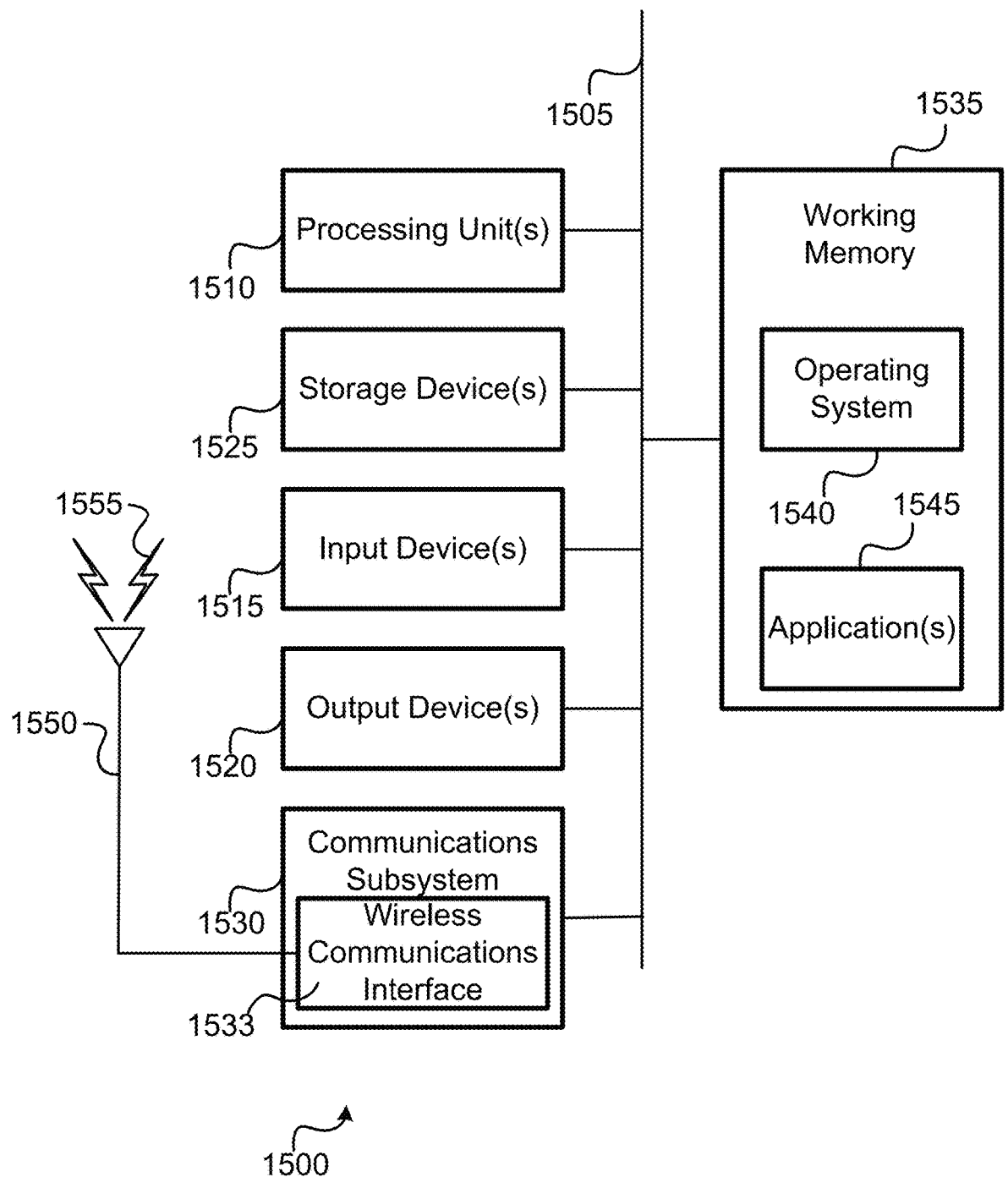
FIG. 15 is a block diagram of an embodiment of a computer system.

FIG. 15 is a block diagram of an embodiment of a computer system 1500, which may be used, in whole or in part, to provide the functions of one or more network components as described in the embodiments herein. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner. In addition, it can be noted that components illustrated by FIG. 15 can be localized to a single device and/or distributed among various networked devices, which may be disposed at different geographical locations.

The computer system 1500 is shown comprising hardware elements that can be electrically coupled via a bus 1505 (or may otherwise be in communication, as appropriate). The hardware elements may include processing unit(s) 1510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1500 also may comprise one or more input devices 1515, which may comprise without limitation a mouse, a keyboard, a camera, a microphone, and/or the like; and one or more output devices 1520, which may comprise without limitation a display device, a printer, and/or the like.

The computer system 1500 may further include (and/or be in communication with) one or more non-transitory storage devices 1525, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1500 may also include a communications subsystem 1530, which may comprise wireless communication technologies managed and controlled by a wireless communication interface 1533, as well as wired technologies (such as Ethernet, coaxial communications, universal serial bus (USB), and the like). The wireless communication interface 1533 may send and receive wireless signals 1555 (e.g. signals according to 5G NR or LTE) via wireless antenna(s) 1550. Thus the communications subsystem 1530 may comprise a modem, a network card (wireless or wired), an infrared communication device, a wireless communication device, and/or a chipset, and/or the like, which may enable the computer system 1500 to communicate on any or all of the communication networks described herein to any device on the respective network, including a User Equipment (UE), base stations and/or other TRPs, and/or any other electronic devices described herein. Hence, the communications subsystem 1530 may be used to receive and send data as described in the embodiments herein.

In many embodiments, the computer system 1500 will further comprise a working memory 1535, which may comprise a RAM or ROM device, as described above. Software elements, shown as being located within the working memory 1535, may comprise an operating system 1540, device drivers, executable libraries, and/or other code, such as one or more applications 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.), then takes the form of executable code.

Figure 16:
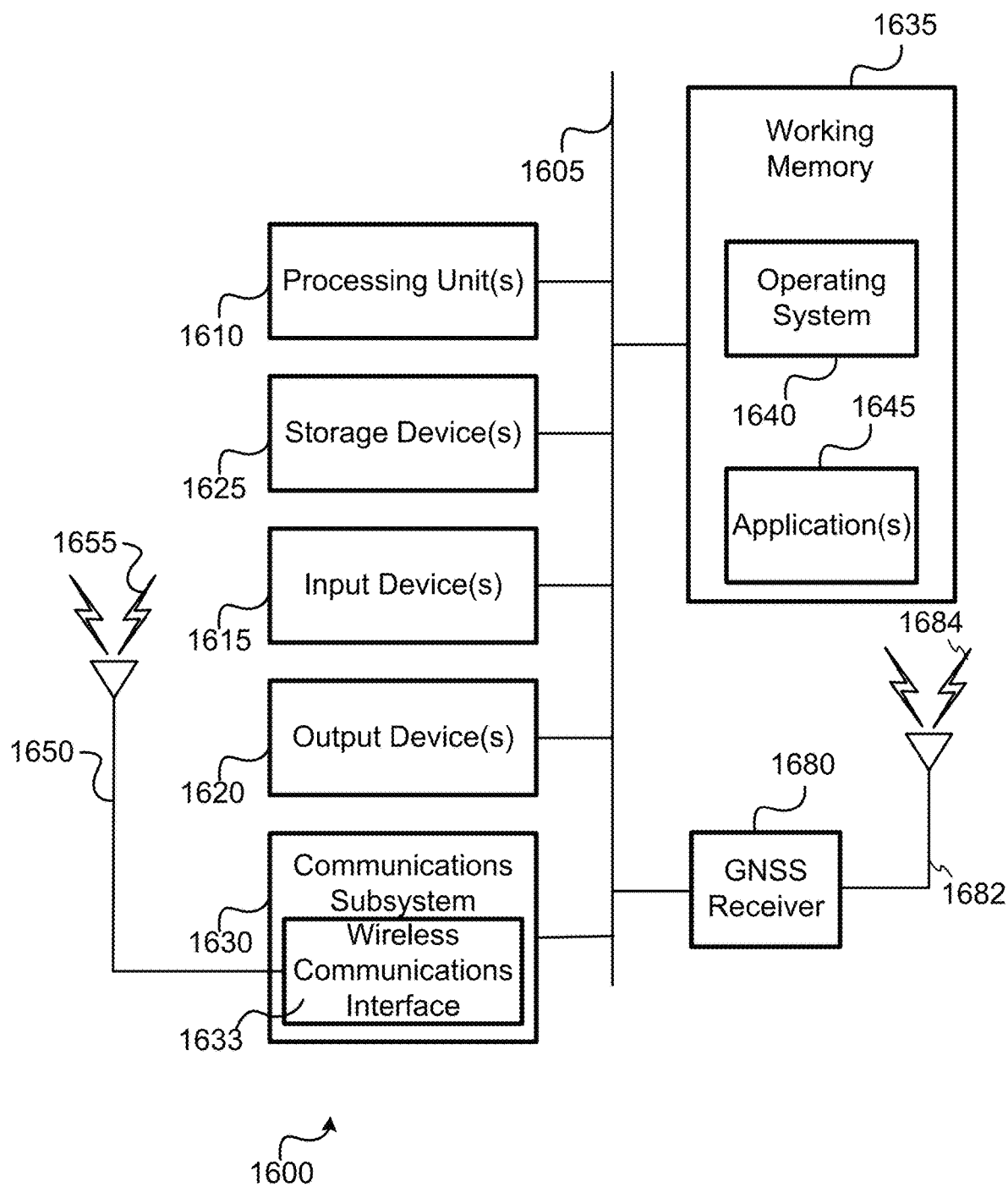
FIG. 16 is a block diagram of an embodiment of a spoofing device.

FIG. 16 is a block diagram of an embodiment of a spoofer 1600, which may be used, in whole or in part, to provide the functions of one or more components as described in the embodiments herein (e.g., spoofer 224 of FIG. 2). It should be noted that FIG. 16 is meant only to provide a generalized illustration of various components, any or all of which may be utilized as appropriate. FIG. 16, therefore, broadly illustrates how individual system elements may be implemented in a relatively separated or relatively more integrated manner. In addition, it can be noted that components illustrated by FIG. 16 can be localized to a single device and/or distributed among various networked devices, which may be disposed at different geographical locations.

The spoofer 1600 is shown comprising hardware elements that can be electrically coupled via a bus 1605 (or may otherwise be in communication, as appropriate). The hardware elements may include processing unit(s) 1610, which may comprise without limitation one or more general-purpose processors, one or more special-purpose processors (such as digital signal processing chips, graphics acceleration processors, and/or the like), and/or other processing structure, which can be configured to perform one or more of the methods described herein. The spoofer 1600 also may comprise one or more input devices 1615; and one or more output devices 1620, which may comprise without limitation a display device.

The spoofer 1600 may further include (and/or be in communication with) one or more non-transitory storage devices 1625, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The spoofer 1600 may also include a communications subsystem 1630, which may comprise wireless communication technologies managed and controlled by a wireless communication interface 1633, as well as wired technologies (such as Ethernet, coaxial communications, universal serial bus (USB), and the like). The wireless communication interface 1633 may send and receive wireless signals 1655 (e.g. signals according to 5G NR or LTE) via wireless antenna(s) 1650. Thus the communications subsystem 1630 may comprise a modem, a network card (wireless or wired), an infrared communication device, a wireless communication device, and/or a chipset, and/or the like, which may enable the spoofer 1600 to communicate on any or all of the communication networks described herein to any device on the respective network, including a User Equipment (UE), base stations and/or other TRPs, and/or any other electronic devices described herein. Hence, the communications subsystem 1630 may be used to receive and send data as described in the embodiments herein.

In many embodiments, the spoofer 1600 will further comprise a working memory 1635, which may comprise a RAM or ROM device, as described above. Software elements, shown as being located within the working memory 1635, may comprise an operating system 1640, device drivers, executable libraries, and/or other code, such as one or more applications 1645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1625 described above. In some cases, the storage medium might be incorporated within a computer system, such as spoofer 1600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the spoofer 1600 and/or might take the form of source and/or installable code, which, upon compilation and/or installation on the spoofer 1600 (e.g., using any of a variety of generally available compilers, installation programs, compression/decompression utilities, etc.), then takes the form of executable code.

Embodiments of the spoofer 1600 may also include a Global Navigation Satellite System (GNSS) receiver 1680 capable of receiving signals 1684 from one or more GNSS satellites using a GNSS antenna 1682 (which may be combined in some implementations with an antenna(s) 1632). Such positioning can be utilized to complement and/or incorporate the techniques described herein. The GNSS receiver 1680 can extract a position of the UE 1300, using conventional techniques, from GNSS satellites of a GNSS system, such as Global Positioning System (GPS), Galileo, GLObal NAvigation Satellite System (GLONASS), Compass, Quasi-Zenith Satellite System (QZSS) over Japan, Indian Regional Navigational Satellite System (IRNSS) over India, Beidou over China, and/or the like. Moreover, the GNSS receiver 1680 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The spoofer 1600 can including GNSS emulation software/hardware or other signal simulation software hardware (e.g., WAN or Wi-Fi or BT). In some embodiments, the spoofer 1600 can be able to emulate all the different sources consistently.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method for detecting Global Navigation Satellite System (GNSS) error, comprising: receiving, at a mobile device, one or more global navigation satellite system (GNSS) signals via a GNSS antenna of the mobile device; determining first movement data based on the one or more GNSS signals; determining second movement data based on data from one or more motion sensors of the mobile device, wherein the first movement data and the second movement data each comprise respective movement-related information regarding the mobile device during a time period; and providing an indication that a GNSS error is occurring based on a determination that a difference between the first movement data and the second movement data exceeds a threshold.

Clause 2: The method of clause 1, wherein the first movement data, the second movement data, or both, comprise data indicative of an acceleration of the mobile device, a velocity of the mobile device, a rotation of the mobile device, or a combination thereof.

Clause 3: The method of any of clauses 1-2 wherein the determination that the difference between the first movement data and the second movement data exceeds the threshold comprises normalizing the first movement data, the second movement data, or both.

Clause 4: The method of any of clauses 1-3 wherein the GNSS antenna and the one or more motion sensors are offset by a known distance.

Clause 5: The method of clause 4 wherein the determination that the difference between the first movement data and the second movement data exceeds the threshold comprises determining that the first movement data and the second movement data reflect an offset distance that is different than the known distance by more than a threshold value.

Clause 6: The method of any of clauses 1-5 wherein the determination that the difference between the first movement data and the second movement data exceeds the threshold comprises: measuring a horizontal estimated position error from a plurality of global navigation satellite system (GNSS) signals; and detecting that the horizontal estimated position error exceeds a threshold error value.

Clause 7: The method of any of clauses 1-6 wherein the mobile device comprises a vehicle; the one or more motion sensors comprise an odometer; and the determination that the difference between the first movement data and the second movement data exceeds the threshold comprises determining a difference between a first velocity value obtained from the odometer and a second velocity value based on the one or more GNSS signals exceeds a threshold value.

Clause 8: The method of any of clauses 1-7 wherein the one or more motion sensors comprise a barometric sensor; and the determination that the difference between the first movement data and the second movement data exceeds the threshold comprises determining a difference between a first change in altitude value determined using the barometric sensor and a second change in altitude value determined using the one or more GNSS signals exceeds a threshold value.

Clause 9: The method of any of clauses 1-8 wherein providing the indication that the GNSS error is occurring is further based on a determination that the first movement data is inconsistent with map data.

Clause 10: The method of any of clauses 1-9 the one or more motion sensors comprise a camera.

Clause 11: A mobile device for detecting Global Navigation Satellite System (GNSS) error, the mobile device comprising: a GNSS receiver communicatively coupled with a GNSS antenna; one or more motion sensors; a memory; and one or more processors communicatively coupled with the GNSS receiver, the one or more motion sensors, and the memory, wherein the one or more processors are configured to: receive, via the GNSS receiver, one or more global navigation satellite system (GNSS) signals via the GNSS antenna; determine first movement data based on the one or more GNSS signals; determine second movement data based on data from the one or more motion sensors of the mobile device, wherein the first movement data and the second movement data each comprise respective movement-related information regarding the mobile device during a time period; and provide an indication that a GNSS error is occurring based on a determination that a difference between the first movement data and the second movement data exceeds a threshold.

Clause 12: The mobile device of clause 11, wherein the one or more processors are configured to determine the first movement data, the second movement data, or both, from data indicative of an acceleration of the mobile device, a velocity of the mobile device, a rotation of the mobile device, or a combination thereof.

Clause 13: The mobile device of any of clauses 11-12 wherein the one or more processors are configured to normalize the first movement data, the second movement data, or both to determine that the difference between the first movement data and the second movement data exceeds the threshold.

Clause 14: The mobile device of any of clauses 11-13 wherein the GNSS antenna and the one or more motion sensors are offset by a known distance.

Clause 15: The mobile device of any of clauses 11-14 wherein, to determine that the difference between the first movement data and the second movement data exceeds the threshold, the one or more processors are configured to determine that the first movement data and the second movement data reflect an offset distance that is different than the known distance by more than a threshold value.

Clause 16: The mobile device of clause 15 wherein, to determine that the difference between the first movement data and the second movement data exceeds the threshold, the one or more processors are configured to measure a horizontal estimated position error from a plurality of global navigation satellite system (GNSS) signals; and detect that the horizontal estimated position error exceeds a threshold error value.

Clause 17: The mobile device of any of clauses 11-16 wherein the mobile device comprises a vehicle; the one or more motion sensors comprise an odometer; and to determine that the difference between the first movement data and the second movement data exceeds the threshold, the one or more processors are configured to determine a difference between a first velocity value obtained from the odometer and a second velocity value based on the one or more GNSS signals exceeds a threshold value.

Clause 18: The mobile device of any of clauses 11-17 wherein the one or more motion sensors comprise a barometric sensor; and to determine that the difference between the first movement data and the second movement data exceeds the threshold, the one or more processors are configured to determine a difference between a first change in altitude value determined using the barometric sensor and a second change in altitude value determined using the one or more GNSS signals exceeds a threshold value.

Clause 19: The mobile device of any of clauses 11-18 wherein the one or more processors are configured to provide the indication that the GNSS error is occurring further based on a determination that the first movement data is inconsistent with map data.

Clause 20: The mobile device of any of clauses 11-19 the one or more motion sensors comprise a camera.

Clause 21: An apparatus for detecting Global Navigation Satellite System (GNSS) error, the apparatus comprising: means for receiving one or more global navigation satellite system (GNSS) signals; means for determining first movement data based on the one or more GNSS signals; means for determining second movement data based on data from one or more motion sensors, wherein the first movement data and the second movement data each comprise respective movement-related information regarding a mobile device during a time period; and means for providing an indication that a GNSS error is occurring based on a determination that a difference between the first movement data and the second movement data exceeds a threshold.

Clause 22: The apparatus of clause 21, wherein further comprising means for determining the first movement data, the determining the second movement data, or both, based on data indicative of an acceleration of the mobile device, a velocity of the mobile device, a rotation of the mobile device, or a combination thereof.

Clause 23: The apparatus of any of clauses 21-22 further comprising means for normalizing the first movement data, the second movement data, or both.

Clause 24: The apparatus of any of clauses 21-23 further comprising means for determining that the first movement data and the second movement data reflect an offset distance that is different than a known distance between a GNSS antenna of the mobile device and the one or more motion sensors by more than a threshold value.

Clause 25: The apparatus of any of clauses 21-24 further comprising means for measuring a horizontal estimated position error from a plurality of global navigation satellite system (GNSS) signals; and means for detecting that the horizontal estimated position error exceeds a threshold error value.

Clause 26: The apparatus of any of clauses 21-25 wherein the mobile device comprises a vehicle; the one or more motion sensors comprise an odometer; and the apparatus comprises means for determining that the difference between the first movement data and the second movement data exceeds the threshold comprise based at least in part on a difference between a first velocity value obtained from the odometer and a second velocity value based on the one or more GNSS signals exceeds a threshold value.

Clause 27: The apparatus of any of clauses 21-26 wherein the one or more motion sensors comprise a barometric sensor; and the apparatus comprises means for determining that the difference between the first movement data and the second movement data exceeds the threshold based at least in part on a difference between a first change in altitude value determined using the barometric sensor and a second change in altitude value determined using the one or more GNSS signals exceeds a threshold value.

Clause 28: The apparatus of any of clauses 21-27 wherein the means for providing the indication that the GNSS error is occurring comprise means for providing the indication further based on a determination that the first movement data is inconsistent with map data.

Clause 29: The apparatus of any of clauses 21-28 the one or more motion sensors comprise a camera.

Clause 30: A non-transitory computer-readable medium storing instructions for detecting Global Navigation Satellite System (GNSS) error, the instructions comprising code for: receiving, at a mobile device, one or more global navigation satellite system (GNSS) signals via a GNSS antenna of the mobile device; determining first movement data based on the one or more GNSS signals; determining second movement data based on data from one or more motion sensors of the mobile device, wherein the first movement data and the second movement data each comprise respective movement-related information regarding a mobile device during a time period; and providing an indication that a GNSS error is occurring based on a determination that a difference between first movement data and the second movement data exceeds a threshold.

What is claimed is:

1. A method for detecting Global Navigation Satellite System (GNSS) error, comprising:
   receiving, at a mobile device, one or more global navigation satellite system (GNSS) signals via a GNSS antenna of the mobile device;
   determining first movement data based on the one or more GNSS signals;
   determining second movement data based on data from one or more motion sensors of the mobile device, wherein the first movement data and the second movement data each comprise respective movement-related information regarding the mobile device during a time period; and
   providing an indication that a GNSS error occurs based on a determination that a difference between the first movement data and the second movement data exceeds a threshold, wherein the first movement data, the second movement data, or both, comprise data indicative of an acceleration of the mobile device, a velocity of the mobile device, a rotation of the mobile device, or a combination thereof.

2. The method of claim 1, wherein the determination that the difference between the first movement data and the second movement data exceeds the threshold comprises normalizing the first movement data, the second movement data, or both.

3. The method of claim 1, wherein the GNSS antenna and the one or more motion sensors are offset by a known distance.

4. The method of claim 3, wherein the determination that the difference between the first movement data and the second movement data exceeds the threshold comprises determining that the first movement data and the second movement data reflect an offset distance that is different than the known distance by more than a threshold value.

5. The method of claim 1, wherein the determination that the difference between the first movement data and the second movement data exceeds the threshold comprises:
   measuring a horizontal estimated position error from a plurality of global navigation satellite system (GNSS) signals; and
   detecting that the horizontal estimated position error exceeds a threshold error value.

6. The method of claim 1, wherein:
   the mobile device comprises a vehicle;
   the one or more motion sensors comprise an odometer; and
   the determination that the difference between the first movement data and the second movement data exceeds the threshold comprises determining a difference between a first velocity value obtained from the odometer and a second velocity value based on the one or more GNSS signals exceeds a threshold value.

7. The method of claim 1, wherein:

the one or more motion sensors comprise a barometric sensor; and the determination that the difference between the first movement data and the second movement data exceeds the threshold comprises determining a difference between a first change in altitude value determined using the barometric sensor and a second change in altitude value determined using the one or more GNSS signals exceeds a threshold value.

8. The method of claim 1, wherein providing the indication that the GNSS error occurs is further based on a determination that the first movement data is inconsistent with map data.

9. The method of claim 1, the one or more motion sensors comprise a camera.

10. A mobile device for detecting Global Navigation Satellite System (GNSS) error, the mobile device comprising:
a GNSS receiver communicatively coupled with a GNSS antenna;
one or more motion sensors;
a memory; and
one or more processors communicatively coupled with the GNSS receiver, the one or more motion sensors, and the memory, wherein the one or more processors are configured to:
receive, via the GNSS receiver, one or more global navigation satellite system (GNSS) signals via the GNSS antenna;
determine first movement data based on the one or more GNSS signals;
determine second movement data based on data from the one or more motion sensors of the mobile device, wherein the first movement data and the second movement data each comprise respective movement-related information regarding the mobile device during a time period; and
provide an indication that a GNSS error occurs based on a determination that a difference between the first movement data and the second movement data exceeds a threshold, wherein the first movement data, the second movement data, or both, comprise data indicative of an acceleration of the mobile device, a velocity of the mobile device, a rotation of the mobile device, or a combination thereof.

11. The mobile device of claim 10, wherein the one or more processors are configured to normalize the first movement data, the second movement data, or both to determine that the difference between the first movement data and the second movement data exceeds the threshold.

12. The mobile device of claim 10, wherein the GNSS antenna and the one or more motion sensors are offset by a known distance.

13. The mobile device of claim 12, wherein, to determine that the difference between the first movement data and the second movement data exceeds the threshold, the one or more processors are configured to determine that the first movement data and the second movement data reflect an offset distance that is different than the known distance by more than a threshold value.

14. The mobile device of claim 10, wherein, to determine that the difference between the first movement data and the second movement data exceeds the threshold, the one or more processors are configured to:
measure a horizontal estimated position error from a plurality of global navigation satellite system (GNSS) signals; and detect that the horizontal estimated position error exceeds a threshold error value.

15. The mobile device of claim 10, wherein:
the mobile device comprises a vehicle;
the one or more motion sensors comprise an odometer; and
to determine that the difference between the first movement data and the second movement data exceeds the threshold, the one or more processors are configured to determine a difference between a first velocity value obtained from the odometer and a second velocity value based on the one or more GNSS signals exceeds a threshold value.

16. The mobile device of claim 10, wherein:
the one or more motion sensors comprise a barometric sensor; and
to determine that the difference between the first movement data and the second movement data exceeds the threshold, the one or more processors are configured to determine a difference between a first change in altitude value determined using the barometric sensor and a second change in altitude value determined using the one or more GNSS signals exceeds a threshold value.

17. The mobile device of claim 10, wherein the one or more processors are configured to provide the indication that the GNSS error occurs further based on a determination that the first movement data is inconsistent with map data.

18. The mobile device of claim 10, the one or more motion sensors comprise a camera.

19. An apparatus for detecting Global Navigation Satellite System (GNSS) error, the apparatus comprising:
means for receiving one or more global navigation satellite system (GNSS) signals;
means for determining first movement data based on the one or more GNSS signals;
means for determining second movement data based on data from one or more motion sensors, wherein the first movement data and the second movement data each comprise respective movement-related information regarding a mobile device during a time period; and
means for providing an indication that a GNSS error occurs based on a determination that a difference between the first movement data and the second movement data exceeds a threshold, wherein the first movement data, the second movement data, or both, comprise data indicative of an acceleration of the mobile device, a velocity of the mobile device, a rotation of the mobile device, or a combination thereof.

20. The apparatus of claim 19, further comprising means for normalizing the first movement data, the second movement data, or both.

21. The apparatus of claim 19, further comprising means for determining that the first movement data and the second movement data reflect an offset distance that is different than a known distance between a GNSS antenna of the mobile device and the one or more motion sensors by more than a threshold value.

22. The apparatus of claim 19, further comprising:
means for measuring a horizontal estimated position error from a plurality of global navigation satellite system (GNSS) signals; and
means for detecting that the horizontal estimated position error exceeds a threshold error value.

23. The apparatus of claim 19, wherein:
the mobile device comprises a vehicle;
the one or more motion sensors comprise an odometer; and the apparatus comprises means for determining that the difference between the first movement data and the second movement data exceeds the threshold comprise based at least in part on a difference between a first velocity value obtained from the odometer and a second velocity value based on the one or more GNSS signals exceeds a threshold value.

24. The apparatus of claim 19, wherein:
the one or more motion sensors comprise a barometric sensor; and
the apparatus comprises means for determining that the difference between the first movement data and the second movement data exceeds the threshold based at least in part on a difference between a first change in altitude value determined using the barometric sensor and a second change in altitude value determined using the one or more GNSS signals exceeds a threshold value.

25. The apparatus of claim 19, wherein the means for providing the indication that the GNSS error occurs comprise means for providing the indication further based on a determination that the first movement data is inconsistent with map data.

26. The apparatus of claim 19, the one or more motion sensors comprise a camera.

27. A non-transitory computer-readable medium storing instructions for detecting Global Navigation Satellite System (GNSS) error, the instructions comprising code for:
receiving, at a mobile device, one or more global navigation satellite system (GNSS) signals via a GNSS antenna of the mobile device;
determining first movement data based on the one or more GNSS signals;
determining second movement data based on data from one or more motion sensors of the mobile device, wherein the first movement data and the second movement data each comprise respective movement-related information regarding the mobile device during a time period; and
providing an indication that a GNSS error occurs based on a determination that a difference between the first movement data and the second movement data exceeds a threshold, wherein the first movement data, the second movement data, or both, comprise data indicative of an acceleration of the mobile device, a velocity of the mobile device, a rotation of the mobile device, or a combination thereof.

* * * * *